US011894615B2

(12) United States Patent
Sikri et al.

(10) Patent No.: US 11,894,615 B2
(45) Date of Patent: Feb. 6, 2024

(54) PHASED ARRAY ANTENNA AND SYSTEM AND METHOD OF ANTENNA OPERATION

(71) Applicant: SATIXFY UK LIMITED, Farnborough (GB)

(72) Inventors: Divaydeep Sikri, Sutton (GB); Janosevic Zoran, Reading (GB); Mario Rui Silveira Pereira, Farnham (GB); Eran Broner, Raanana (IL)

(73) Assignee: SATIXFY UK LIMITED, Farnborough (GB)

(*) Notice: Subject to any disclaimer, the term of this patent is extended or adjusted under 35 U.S.C. 154(b) by 224 days.

(21) Appl. No.: 17/617,392

(22) PCT Filed: Jun. 8, 2020

(86) PCT No.: PCT/IL2020/050636
§ 371 (c)(1),
(2) Date: Dec. 8, 2021

(87) PCT Pub. No.: WO2020/250219
PCT Pub. Date: Dec. 17, 2020

(65) Prior Publication Data
US 2022/0239014 A1    Jul. 28, 2022

(30) Foreign Application Priority Data
Jun. 10, 2019    (IL) .......................... 267203

(51) Int. Cl.
H01Q 21/08    (2006.01)
H01Q 15/24    (2006.01)
H04B 1/00    (2006.01)

(52) U.S. Cl.
CPC .......... *H01Q 21/08* (2013.01); *H01Q 15/244* (2013.01); *H04B 1/006* (2013.01); *H04B 1/0067* (2013.01)

(58) Field of Classification Search
CPC ...... H01Q 21/08; H01Q 21/245; H01Q 21/28; H01Q 15/242; H01Q 15/244
See application file for complete search history.

(56) References Cited

U.S. PATENT DOCUMENTS 8,693,970 B2    4/2014 Corman et al.
2007/0096982 A1*    5/2007 Kalian ................... H01Q 25/02
342/377

(Continued)

FOREIGN PATENT DOCUMENTS

WO    2017/153985 A1    9/2017
WO    2018/190794 A1    10/2018

*Primary Examiner* — Hoang V Nguyen
(74) *Attorney, Agent, or Firm* — Browdy and Neimark, PLLC

(57) ABSTRACT

A control system is presented for controlling operation of a phased-array antenna comprising N antenna elements each comprising H and V polarization terminals. The control system includes: an analogue circular polarization system (ACTS) and a digital polarization control system (DPCS). The ACPS comprises an array of N analogue circular polarization circuits (ACPCs) associated with said N antenna elements, respectively, such that each ACPC is connectable to the V and H polarization terminals of the respective antenna element. The ACPS is configured and operable with N analog circular polarization signal components each being either left or right circular polarization signal. The DPCS comprises: an array of N convertors associated with said N ACPCs, respectively, for converting between the N analog circular polarization (ACP) signals and N respective digital circular polarization (DCP) signals, such that each antenna element is associated with a respective single one of said N convertors; an array of N digital polarization controlled beamformers (DPCBs) connectable to said N convertors; and a plurality of digital signal splitters (Continued)

and/or combiners. Each DPCB comprises at least two beam forming channels associated with at least two, first and second, respective beams of different beam directions and/or different polarizations being operated by the antenna element, and is configured and operable to apply phase shifting to the respective DCP signal based on data indicative of a beaming direction ($\alpha$) of a respective beam to be operated and the left or right polarization of circular polarization signal, and a relative phase ($\Phi$) associated with the beaming direction ($\alpha$) and a location of the respective antenna element in the array, to thereby form at least
two phase shifted signals corresponding to said at least two, first and second, respective beams. Digital signal splitters and/or combiners operate to separately combine the phase shifted signals corresponding to respectively the at least first and second beams, wherein at least two convertors of said N convertors are connected to a respective one of the signal splitters and/or combiners, and wherein each digital splitter and/or combiner, connected to the at least two converters, converts between the DCP signals of opposite left and right circular polarizations of the at least two convertors and V and H linear polarization components and splits and/or combines the opposite left and right circular polarization signals of the at least two convertors.

17 Claims, 12 Drawing Sheets

(56) References Cited

U.S. PATENT DOCUMENTS

| | | |
|---|---|---|
| 2013/0088391 A1 | 4/2013 | Corman et al. |
| 2017/0054222 A1* | 2/2017 | Corman ................. H01Q 3/36 |
| 2018/0337722 A1 | 11/2018 | Paulsen et al. |
| 2019/0089434 A1* | 3/2019 | Rainish ................ H04B 7/0617 |

* cited by examiner

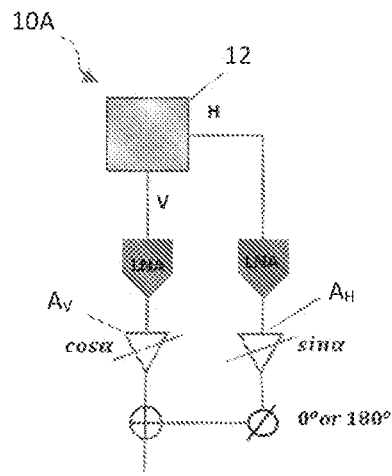
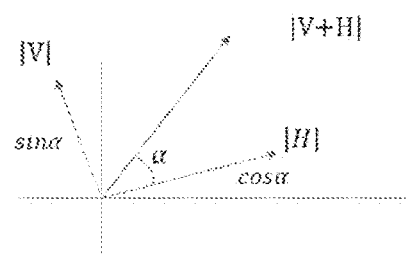
FIG. 1B
FIG. 1C
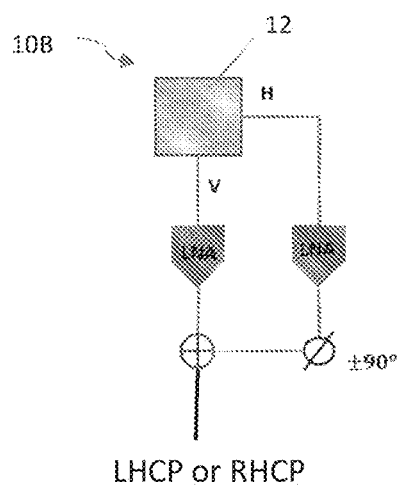
LHCP or RHCP
FIG. 1D
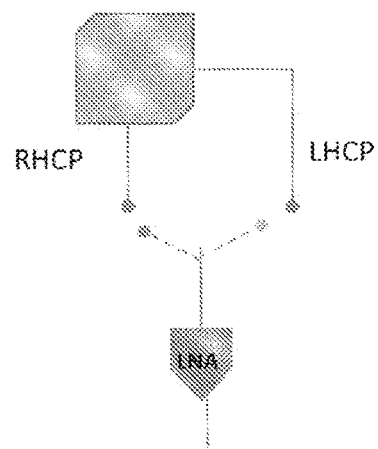
FIG. 1E

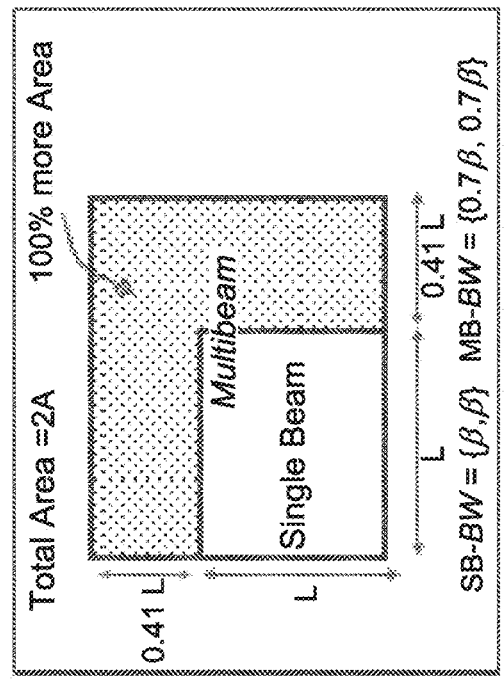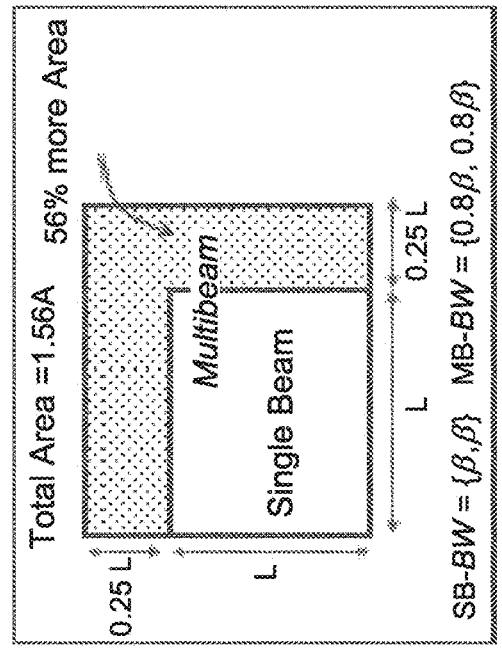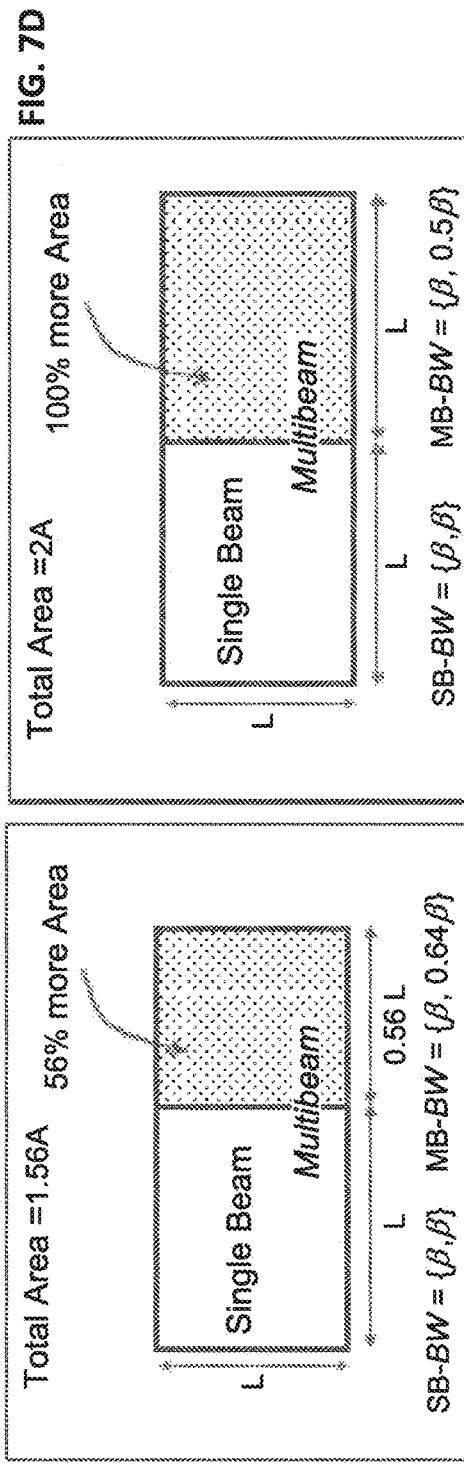

PHASED ARRAY ANTENNA AND SYSTEM AND METHOD OF ANTENNA OPERATION

TECHNOLOGICAL FIELD AND BACKGROUND

The present invention is in the field of communication techniques, particularly useful for satellite based communication, and relates to a phased array antenna and a method of managing the phased array antenna operation at a terminal station.

Satellite communication techniques utilize such main components as a ground segment that includes satellite terminals and, typically, gateway terminals, and the space segment, which is the satellite itself. Terminal antenna, which is one of the main elements of the communication system enabling satellite control and payload operations, may include transceiver modules utilizing electronically steerable phased array antennas, which provide multiple simultaneous ground to satellite links.

Polarization is an important factor for such communication systems, because antennas are sensitive to polarization, and generally only receive or transmit a signal with a particular polarization. Hence, in order to obtain the maximum signal, it is important to match the polarization of the antenna to that of the incoming/outgoing signal. If the antenna polarization does not match that of the signal, there is a corresponding decrease in the level of the signal (i.e., it is reduced by a factor of cosine of the angle between the polarization of the antenna and the signal).

For example, WO 2017/153985, assigned to the assignee of the present application, describes a digital baseband beam forming system enabling control over vertical polarization, horizontal polarization, or any slant angle polarization of the beams. The system may support right hand circular polarization, left hand circular polarization or any required elliptical polarization.

U.S. Pat. No. 8,693,970 describes a multi-beam active phased array architecture with independent polarization control. According to this technique, a phased array antenna comprises multiple subcircuits in communication with multiple radiating elements. The radiofrequency signals are independently adjusted for both polarization control and beam steering. In the receiving mode, multiple RF signals of various polarizations are received and combined into at least one receive beam output. In the transmission mode, at least one transmit beam input is divided and transmitted through multiple radiating elements, with the transmitted beams having various polarizations.

GENERAL DESCRIPTION

There is a need in the art for a novel approach for polarization control to optimize the antenna system performance, allowing concurrent operation with two or more input signals of different polarizations associated with the same or different sources. In this connection, it should be understood that the antenna system is typically for operation as a transceiver system for receiving and transmitting radiation from and to remote sources.

Most satellites operate with two orthogonal polarizations (vertical V and horizontal H polarizations) in both transmission and receiving modes, and in some cases operate with the same frequencies. As a result, polarization is the only factor enabling to separate/distinguish between different communication channels. In certain cases, the geostationary satellites emit and receive signals according to a right or left circular polarization. In linear polarization case, the V and H polarization components have the same phase but different relative power. For circular polarization, the V and H polarization components are out of phase by 90 degree but have the same power.

Linear polarization is scan angle dependent: linear polarization changes with different scan angles. Hence, each beam can be of different linear polarization in addition to different angle of incidence. Therefore, polarization control becomes a challenge.

The above is more critical for multi-beam antenna systems, i.e. a system that is to operate with (receive and/or transmit) multiple beams (of the same beam direction or different directions) with multiple polarizations. For example, a terminal might require to receive data and TV beams from different satellites; or signals of orthogonal polarizations (V and H polarization components) from the same satellite can be received by the same terminal. Depending on location/orientation of the terminal it might be exposed to a large spread in polarization of different beams.

Multi-beam with linear polarization requires additional circuitry for polarization control in addition to separate circuit for each beam operation (transmission/reception). To implement such a system in analogue system configuration would require significant complexity and increased costs, since the number of circuits and output scales with a number of beams with independent polarization control. This might be achieved sub-optimally, by applying sub-optimal linear polarization for all the beams, but this would reduce the effective SNR and make beam susceptible to interference.

Generally, signals received on V and H polarization ports may be taken separately into digital domain, and then polarization control can be performed. This technique, however, would also double up the number of components (RF and/or Digital). Such increased density of analog and/or digital chips, increases the power consumption, as well as makes problematic such effects as routing and heat dissipation.

The present invention provides a novel approach for controlling operation of a multi-beam phased-array antenna system (i.e. multi-beam electronically steerable antenna system). According to this approach, polarization control for linear polarized beams is implemented within a digital beam forming system, by distributing the control via combination of analog and digital control circuits. As indicated above, the antenna system may operate in either one or both of receiving and transmitting modes. Thus, generally, in the description below the incoming (received) or outgoing (transmitted) signal is at times referred to as an operational signal. Specific examples of the embodiments of the invention described below with regard to the configuration and operation of the antenna system of the present invention might at times, for simplicity, refer to the receiving mode of the antenna operation. However, it should be understood that the principles of the invention are not limited to the receiving mode of the antenna system operation. As known in the art, the receiving and transmitting beaming directions of the antenna operation are interchangeable.

Thus, according to the invention, the antenna system operates/treats an operational signal having linear polarization (a) as a circular polarized signal and processes/analyzes it as either right hand circular polarization RHCP or left hand circular polarization LHCP (by appropriate analogue polarization control). It should be understood that according to this approach the linear polarized signal is treated (processed/analyzed) as if it is circular polarized, and thus necessary polarization control is applied on the receiver/ transmitter utility. As will be described more specifically further below, in some embodiments, elements which process the operational signals as RHCP and/or LHCP are randomly chosen/programmed, and this random orientation can be changed over time. Further, according to the invention, the polarization control is done at the beam former level (in digital domain), where signal at each element, which processed the operational (incoming/outgoing) signal as RHCP or LHCP, undergoes a phase shift or phase rotation by a predetermined factor of one of two opposite signs (clockwise or counterclockwise direction), and then combined together.

Thus, the signal from the element, which processed the operational signal, e.g. the received signal, as RHCP, is phase rotated by $-(\phi_m^{RHCP}+\alpha_m)$ and the signal from the element which processed the received signal as LHCP is rotated by $-(\phi_m^{LHCP}-\alpha_m)$, and the so-rotated signals are combined together. The factor of phase shift/rotation depends on the following: (i) linear polarization ($\alpha$), and (ii) the relative phase $\phi_m$ related to the beaming direction m for the respective antenna element in the array. The linear polarization ($\alpha$), as indicated above, is scan angle dependent (i.e. linear polarization changes with different scan angles/directions), and the beam forming thus takes into account a skew correction $\alpha_m$ which is the polarization dependent factor associated with the required linear polarization and the beam direction m.

Also, the present invention provides flexibility to switch/shift between the two schemes (operational modes) of using Analog Linear Polarization control and treating the Linear Polarized signal as combination of LHCP and RHCP in Analog circuit/scheme, and then performing the beamforming with correct polarization phase rotation in digital mode/scheme. Such switch/shift between the different schemes may be performed dynamically, e.g. for single beam vs multibeam reception.

Thus, according to one broad aspect of the invention, it provides a control system for controlling operation of a phased-array antenna including N antenna elements each comprising H and V polarization terminals/ports. The control system is configured as an electronic system connectable to the polarization ports of the antenna elements, and includes an analogue circular polarization system and a digital beam forming system.

The analogue circular polarization system includes an array of N analogue circular polarization circuits associated with said N antenna elements, respectively, such that each analogue circular polarization circuit is connectable to the V and H polarization terminals of the respective antenna element, and is configured and operable for carrying out the following: in the antenna element operation in a receiving configuration processing H and V linear polarization components of an operational signal being received by the respective antenna element as an analog circular polarization signal component, and in the antenna element operation in a transmission configuration processing an analog circular polarization signal component of an operation signal by the respective antenna element as the H and V linear polarization components being transmitted. The analogue circular polarization system thereby operates with N analog circular polarization signal components each being either left or right circular polarization signal.

The digital beam forming system includes an array of N convertors associated with said N analogue circular polarization circuits, respectively, for converting between the N analog circular polarization signals and N respective digital circular polarization signals, such that each antenna element is associated with a respective single one of said N convertors. Further provided in digital beam forming system are: an array of N digital polarization controlled beamformers connectable, respectively, to said N convertors; and a plurality of digital signal splitters and/or combiners. Each digital polarization controlled beamformer comprises at least two beam forming channels associated with at least two, first and second, respective beams of different beam directions and/or different polarizations being operated by the antenna element, each of said at least two beam forming channels being configured and operable to apply phase shifting to the respective digital circular polarization signal based on data indicative of a beaming direction ($\alpha$) of a respective beam to be operated and the left or right polarization of circular polarization signal, and a relative phase ($\phi$) associated with the beaming direction ($\alpha$) and a location of the respective antenna element in the array, to thereby form at least two phase shifted signals corresponding to said at least two, first and second, respective beams. The plurality of digital signal splitters and/or combiners are configured and operable for separately combining the phase shifted signals corresponding to respectively the at least first and second beams, wherein at least two convertors of said N convertors are connected to a respective one of the signal splitters and/or combiners, and wherein each of said digital splitters and/or combiners, connected to the at least two converters, is configured and operable for converting between the digital circular polarization signals of opposite left and right circular polarizations of the at least two convertors and V and H linear polarization components and splitting and/or combining the opposite left and right circular polarization signals of the at least two convertors.

The data indicative of the linear polarization and the relative phase for the respective antenna element in the array may be previously determined/defined, and stored in a memory/storage utility, to be duly obtained by each of the digital polarization controlled beamformers.

The analogue circular polarization circuit may perform the conversion of the operational signal, i.e. convert H and V polarization components of the incoming signal to the circular polarization signal component by combining the H and V polarization components with "+90°" or "−90°" phase shift; or convert the outgoing circular polarized signal by rotating and splitting into the two linear polarization components. The analogue circular polarization circuit may utilize data indicative of a carrier frequency ($f_c$) of the operational beams/signals being received in order to demodulate the circular polarization signal, and the A/D conversion is performed with respect to a demodulated circular polarization signal.

Each of the at least two beam forming channels is configured and operable to apply the phase shifting to the respective i-th digital circular polarization signal to thereby form a certain m-th direction beam with a first linear polarization by applying either a "positive" phase shift ($\phi_i+\alpha_m$) to the left circular polarization signal or "opposite" phase shift ($\phi_i-\alpha_m$) to the right circular polarization signal. Here, $\phi_i$ is the antenna element's position dependent phase required for the beam forming, and $\alpha_m$ is the polarization dependent skew correction associated with the required linear polarization and the beam direction.

In some embodiments, the array of N antenna elements and the analogue circular polarization circuits are configured and operable to define the circular polarization signal components of both the left and right circular polarizations.

As indicated above, the concurrently operated (received/transmitted) different beams may be associated (originated at/addressed to) with different satellites or may be beams of different linear polarization signals associated with the same satellite. In case the terminal antenna operates concurrently at least two beams associated with different satellites (i.e. different scan angle dependent linear polarizations/different skew factors), it would be sufficient to operate with either left-hand circular polarization configuration or right-hand circular polarization. In case the terminal antenna operates concurrently at least two beams of different linear polarizations associated with the same satellite (i.e. the same skew factor $\alpha_m$), both the left-hand and the right-hand circular polarization configurations are to be used.

It should be understood that the elements/utilities of the antenna system perform similar reverse procedures for the receiving and transmitting modes. For simplicity the description below refers to the receiving mode of the antenna operation.

In some examples of the system configuration, the array of N antenna elements with their respective analogue circular polarization circuits are formed by first and second sub-arrays, such that each analogue circular polarization circuit of the first sub-array performs the conversion to produce the circular polarization signal component of left circular polarization, and each analogue circular polarization circuit of the second sub-array performs the conversion to produce the circular polarization signal component of right circular polarization. The first and second sub-arrays may include identical or different numbers of the analogue circular polarization circuits. The analogue circular polarization circuits of the first and second sub-arrays are preferably alternatively arranged forming the array of N analogue circular polarization circuits, and even more preferably the analogue circular polarization circuits of the first and second sub-arrays are randomly arranged between them forming the array of N analogue circular polarization circuits.

Alternatively, or additionally, the control system may include an orientation controller configured and operable for dynamically changing orientation of the H or V ports of at least some of the antenna elements by +90° or −90° polarization rotation to produce time series randomization of the circular polarization signal component of the left and right circular polarization.

Each of the plurality of the digital signal splitters and/or combiners may separately combine the phase shifted signals corresponding to the right circular polarization signal components and the phase shifted signals corresponding to the left circular polarization signal components, corresponding to the same beam.

The invention, in its some other aspects, also provides a phased-array antenna operation system comprising an array of N antenna elements and the above-described control system; as well as provides a phased-array antenna operation system comprising first and second control systems each configured as the control system described above and both being operable with, respectively, left and right circular polarizations.

The invention in its yet further broad aspect provides a method for controlling operation of a phased-array antenna including N antenna elements comprising H and V polarization terminals According to this method, for each antenna element, analogue signal processing is applied to polarized signals being received or transmitted via the H and V polarization terminals to, respectively, convert H and V polarization components being received by the antenna element to a circular polarization signal component being either left or right circular polarization signal or convert a circular polarization signal component to H and V linear polarizations being transmitted by the antenna element, and perform A/D or D/A conversion of the circular polarization signal; and applying digital signal processing to digital circular polarization signals corresponding to the antenna elements, respectively. More specifically, the method comprises:

for each antenna element, applying analogue signal processing for carrying out the following: in the antenna element operation in a receiving configuration, processing H and V polarization components of an operational signal being received by the respective antenna element as an analog circular polarization signal component being either left or right circular polarization signal, and in the antenna element operation in a transmission configuration processing an analog circular polarization signal component of an operation signal of the respective antenna element as the H and V linear polarization components being transmitted, said analogue signal processing thereby operating with N analog circular polarization signal components each being either left or right circular polarization signal;

applying digital signal processing comprising: converting between the N analog circular polarization signals and N respective digital circular polarization signals, such that the N antenna elements are associated with N respective convertors; applying polarization controlled beamforming to each of the digital circular polarization signals by at least two beam forming channels corresponding to at least two, first and second, respective beams of different beam directions and/or different polarizations being received by the antenna element, each of said at least two beam forming channels being configured and operable to apply phase shifting to the respective digital circular polarization signal based on data indicative of a beaming direction ($\alpha$) of a respective beam to be received thereby and the left or right polarization of circular polarization signal, and a relative phase ($\phi$) associated with the beaming direction and a location of the respective antenna element in the array, to thereby form at least two phase shifted signals corresponding to said at least two, first and second, respective beams; and providing connection of at least two convertors of said N convertors to a respective one of a plurality of signal splitters and/or combiners for separately combining the phase shifted signals corresponding to respectively the at least first and second beams, wherein each of said digital splitters and/or combiners operates for converting between the digital circular polarization signals of opposite left and right circular polarizations of the at least two convertors and V and H linear polarization components and splitting and/or combining the opposite left and right circular polarization signals of the at least two convertors.

Considering, for example, the antenna operation in the receiving mode, the digital signal processing comprises the following: applying polarization controlled beamforming to each of the digital circular polarization signals by at least two beam forming channels corresponding to at least two, first and second, respective beams of different beam directions and/or different polarizations being received by the antenna element, each of said at least two beam forming channels being configured and operable to apply phase shifting to the respective digital circular polarization signal based on data indicative of a linear polarization of a respective beam to be received thereby and the left or right polarization of circular polarization signal, and a relative phase associated with the beaming direction and a location of the respective antenna element in the array, to thereby form at least two phase shifted signals corresponding to said at least two, first and second, respective beams; and separately combining the phase shifted signals for all the antenna elements corresponding to each of the at least first and second beams.

It should be understood that technique of the present invention advantageously provides for reducing the number of analogue components (hardware components, such as A-to-D circuits) as compared to the conventional approaches for polarization controlled phased array antenna. Also, the invention improves SNR of the received H and V polarizations (because the formation of the first linear polarization signal by the digital combination of the left and right circular polarized signals as described above by each beam forming circuitry operates as a notch filter for the opposite linear polarized signal). Also, as will be described further below, the antenna pattern is improved.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIGS. 1B and 1C schematically illustrate the principles of configuration and operation of a linear polarization signal receiver;

FIG. 1D illustrates a receiver configuration for receiving a linear polarized signal as a circular polarized signal and producing either left hand circular polarized (LHCP) signal or right hand circular polarized (RHCP) signal;

FIG. 1E illustrates a receiver in which a circular patch directly produces RHCP and LHCP signals;

FIGS. 6A-6D and 7A-7D exemplify how the technique of the invention can be used for optimizing the multi-beam antenna performance by dynamically shifting the polarization control between analog and digital circuits, as well as shifting between or combining single-beam and multi-beam operational modes.

DETAILED DESCRIPTION OF EMBODIMENTS

As described above, most satellites operate with two orthogonal polarizations (vertical V and horizontal H polarizations) in both transmission and receiving modes, and in some cases operate with the same frequencies; and in certain cases, the geostationary satellites emit and receive signals according to a right or left circular polarization.

Figure 1A:
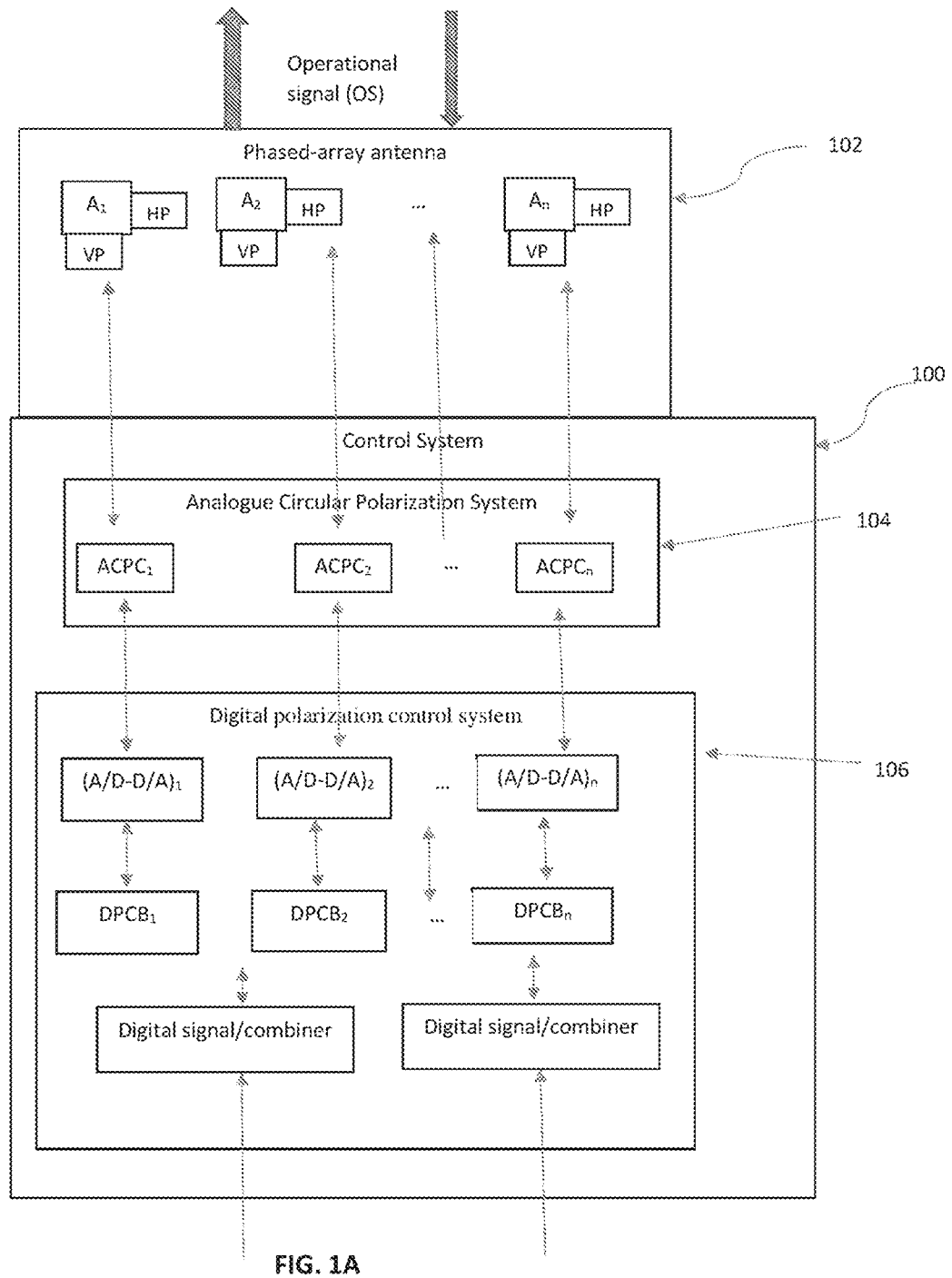
FIG. 1A is a block diagram schematically illustrating a control system for controlling operation of a phased-array antenna.

Referring to FIG. 1, there is schematically illustrated, by way of a block diagram, a control system 100 of the invention for controlling operation of a phased-array antenna 102. The phased-array antenna 102 may be of any known suitable configuration including an array of N antenna elements $A_1, A_2, \ldots, A_n$ each having horizontal and vertical polarization ports HP and VP. The control system 100 of the invention is an electronic system connectable to the polarization ports of the antenna elements, and includes such main parts as an analogue circular polarization system 104 and a digital beam forming system 106.

The analogue circular polarization system 104 includes an array of N analogue circular polarization circuits, $ACPC_1$, $ACPC_2 \ldots, ACPC_n$, each connectable to the V and H polarization ports of the respective one of N antenna element. Each i-th analogue circular polarization circuit $ACPC_i$ is configured and operable to selectively process H and V linear polarization components of an operational signal OS being received by the respective antenna element as a circular polarization signal component (with respect to incoming operational signal, in the receiving mode of operation) and selectively process the circular polarization signal component of the operational signal OS being transmitted by the respective antenna element as the H and V linear polarization components (with respect to outgoing operational signal, in the transmitting mode of operation). The circular polarization signal component is either left or right circular polarization signal.

The digital beam forming system 106 includes a corresponding array of A/D-and-D/A convertors, $(A/D-D/A)_1$, $(A/D-D/A)_2, \ldots (A/D-D/A)_n$, connectable to, respectively, the N analogue circular polarization circuits, $ACPC_1$, $ACPC_2 \ldots, ACPC_n$, to selectively form an array of N digital circular polarization signals corresponding to the operational signal being received by the N antenna elements and selectively convert the N digital circular polarization signals to corresponding analogue input to the N analogue circular polarization circuits. Further provided in the digital beam forming system 106 is an array of N digital polarization controlled beamformers, $DPCB_1$, $DPCB_2, \ldots, DPCB_n$, which are capable of performing beam forming processing to the respective N digital circular polarization signals. The digital polarization controlled beamformers are connected to and an array of two or more digital signal splitters/combiners.

As will be described more specifically further below, with reference to the non-limiting example of FIG. 2 describing the receiving operational mode of the system, each i-th digital polarization controlled beamformer $DPCB_i$ includes at least two beam forming channels associated with at least two, first and second, respective beams of different beam directions and/or different polarizations being operated by the antenna element. Each of these at least two beam forming channels is adapted to apply phase shifting to the respective digital circular polarization signal to thereby form at least two phase shifted signals corresponding to the at least two, first and second, respective beams. The phase shift is based on data indicative of a linear polarization of a respective operational signal (to be received or to be transmitted) and the left or right polarization of the circular polarization signal, and a relative phase associated with the beaming direction and a location of the respective antenna element in the array.

The digital signal splitter/combiners are configured and operable to properly split or combine the phase shifted signals corresponding to respective beams.

As mentioned above, the control system of the invention may be used for operating the antenna system in either one or both of receiving and transmitting modes. Specific examples of the embodiments of the invention are described below with regard to the configuration and operation of the antenna system of the present invention in the receiving mode. However, it should be understood that the principles of the invention are not limited to the receiving mode of the antenna system operation. As known in the art, the receiving and transmitting beaming directions of the antenna operation are interchangeable.

FIGS. 1B and 1C schematically illustrate the principles of configuration and operation of linear polarization receiver 10A, suitable for use in terminal antenna system. As shown, a signaling module 12 of antenna element has vertical (V) and horizontal (H) polarization ports and respective V and H polarization components are processed by analogue circuits of low noise amplifiers (LNAs).

Considering "ideal" linear polarization channel, the components V and H can be rewritten, respectively, as:

$$V_{ideal} = \cos\alpha \ \text{Re}\{x(t)\exp(j2\pi f_c t)\}$$
$$H_{ideal} = \sin\alpha \ \text{Re}\{x(t)\exp(j2\pi f_c t)\}$$

wherein x(t) is the input signal received by the antenna element, $f_c$ is the carrier frequency of the signal.

These signals have the same phase but different relative power, and are scan angle dependent. Accordingly, in order to obtain the maximum signal, the H and V polarization components are further processed by corresponding attenuators $A_H$ and $A_V$ (to compensate for the signal reduction, as described above), and then one of these polarization components is phase shifted prior to combining them together. The output combined signal |V+H| can be determined as:

$$\frac{1}{\sqrt{2}}\text{Re}\{x(t)\exp(j2\pi f_c t)\} + \frac{1}{\sqrt{2}}(n_v\cos\alpha + n_H\sin\alpha) \quad (1)$$

wherein x(t) is the input signal received by the antenna element, $f_c$ is the carrier frequency of the signal, α is the skew factor (describing scan angle dependency of the linear polarization), and $n_V$ and $n_H$ are noise-relating factors.

For "ideal" circular polarization signal, the V and H polarization components can be written as:

$$V_{ideal} = \frac{1}{\sqrt{2}}\text{Re}\{x(t)\exp(j2\pi f_c t)\}$$
$$H_{ideal} = \frac{1}{\sqrt{2}}\text{Re}\left\{x(t)\exp\left(j2\pi f_c t \pm \frac{\pi}{2}\right)\right\}$$

These signals are out of phase by 90 degrees but have the same power, and therefore there is no need for attenuators. The output combined signal can be determined as:

$$\text{Re}\{x(t)\exp(j2\pi f_c t)\} + \frac{1}{\sqrt{2}}(n_v + n_H) \quad (2)$$

FIG. 1D illustrates a receiver configuration for receiving a linear polarized signal as a circular polarized one in the RF channel and produces either left hand circular polarized (LHCP) signal or right hand circular polarized (RHCP) signal. In the figures, the same reference numerals/indexes are used to identify the elements that are common in all the examples. FIG. 1E shows yet another configuration of a receiver in which a circular patch directly produces RHCP and LHCP signals. This configuration has no 90° shifter and uses a single LNA circuit.

By receiving the linearly polarized signal as a circular polarized one in the RF domain, the original signal is rotated by a fixed offset corresponding to the linear polarization angle. All the information of the original linear polarized signal is still preserved for all the beams with different linear polarizations. The original linear polarized signal can be extracted after receiving it as circular polarized. To this end, the baseband circular polarized signal needs to be de-rotated by its linear polarization angle. Indeed, the received linear components and combined signal are as follows:

$$V = \cos\alpha \ \text{Re}\{x(t)\exp(j2\pi f_c t)\}$$
$$H = \sin\alpha \ \text{Re}\{x(t)\exp(j2\pi f_c t)\}$$
$$Z = \frac{1}{\sqrt{2}}(\cos\alpha\text{Re}\{x(t)\exp(j2\pi f_c t)\} + \sin\alpha\text{Re}\{x(t)\exp(j2\pi f_c t + \pi/2)\})$$

The above can be re-written as:

$$Z = \frac{1}{\sqrt{2}}(\cos\alpha(x_R(t)\cos(2\pi f_c t) - x_I(t)\sin(2\pi f_c t)) +$$
$$\sin\alpha(x_R(t)\cos(2\pi f_c t + \pi/2) - -x_I(t)\sin(2\pi f_c t + \pi/2)))$$

wherein $x_R(t)$ and $x_I(t)$ are real and imaginary parts of the signal x(t).

$$Z = \frac{1}{\sqrt{2}}(\cos\alpha(x_R(t)\cos(2\pi f_c t) - x_I(t)\sin(2\pi f_c t)) +$$
$$\sin\alpha(-x_R(t)\sin(2\pi f_c t) - -x_I(t)\cos(2\pi f_c t)))$$
$$Z = \frac{1}{\sqrt{2}}(x_R(t)\cos\alpha - x_I(t)\sin\alpha)\cos(2\pi f_c t) + +\frac{1}{\sqrt{2}}$$
$$(-x_R(t)\sin\alpha - x_I(t)\cos\alpha)\sin(2\pi f_c t)$$

After down-conversion at baseband, we have:

$$Z = \frac{1}{\sqrt{2}}(x_R(t)\cos\alpha - x_I(t)\sin\alpha)$$
$$\cos(2\pi f_c t) + +\frac{1}{\sqrt{2}}(-x_R(t)\sin\alpha - x_I(t)\cos\alpha)\sin(2\pi f_c t)$$

-continued $$Z_B = \frac{1}{\sqrt{2}}((x_R(t)\cos\alpha - x_I(t)\sin\alpha) + j(x_R(t)\sin\alpha + x_I(t)\cos\alpha))$$

$$Z_B = \frac{1}{\sqrt{2}}((x_R(t)\cos\alpha - x_I(t)\sin\alpha) + j(x_R(t)\sin\alpha + x_I(t)\cos\alpha))$$

and after dropping coefficient $$\frac{1}{\sqrt{2}}:$$

$$\tilde{x}_R(t) + j\tilde{x}_I(t) = (x_R(t)\cos\alpha - x_I(t)\sin\alpha) + j(x_R(t)\sin\alpha + x_I(t)\cos\alpha)$$

$$\Rightarrow \begin{bmatrix} \tilde{x}_R(t) \\ \tilde{x}_I(t) \end{bmatrix} = \begin{bmatrix} \cos\alpha & -\sin\alpha \\ \sin\alpha & \cos\alpha \end{bmatrix} \begin{bmatrix} x_R(t) \\ x_I(t) \end{bmatrix} = \Delta \begin{bmatrix} x_R(t) \\ x_I(t) \end{bmatrix}$$

$$\Rightarrow \begin{bmatrix} x_R(t) \\ x_I(t) \end{bmatrix} = \Delta^{-1} \begin{bmatrix} \tilde{x}_R(t) \\ \tilde{x}_I(t) \end{bmatrix} = \begin{bmatrix} \cos\alpha & \sin\alpha \\ -\sin\alpha & \cos\alpha \end{bmatrix} \begin{bmatrix} \tilde{x}_R(t) \\ \tilde{x}_I(t) \end{bmatrix}$$

wherein $$\begin{bmatrix} \cos\alpha & \sin\alpha \\ -\sin\alpha & \cos\alpha \end{bmatrix}$$

is the rotation matrix
Thus, we have:

$$\begin{bmatrix} x_R(t) \\ x_I(t) \end{bmatrix} = \begin{bmatrix} \cos\alpha & \sin\alpha \\ -\sin\alpha & \cos\alpha \end{bmatrix} \begin{bmatrix} \tilde{x}_R(t) \\ \tilde{x}_I(t) \end{bmatrix}$$

Let us now consider a multi-beam configuration for each antenna element in the phased array antenna. As described above, this may be the case when the terminal antenna is required to concurrently receive multiple beams (e.g. data and TV beams) from different satellites; or when the same terminal antenna is required to concurrently receive orthogonal polarizations (V and H polarizations) from the same satellite.

Such multi-beam configuration with linear polarization requires additional circuitry for polarization control in addition to separate circuit for each beam transmission. It is evident that implementing such a multi-beam configuration using analogue circuits for all the antenna elements significantly complicates the hardware of the system and increases the costs.

Figure 1F:
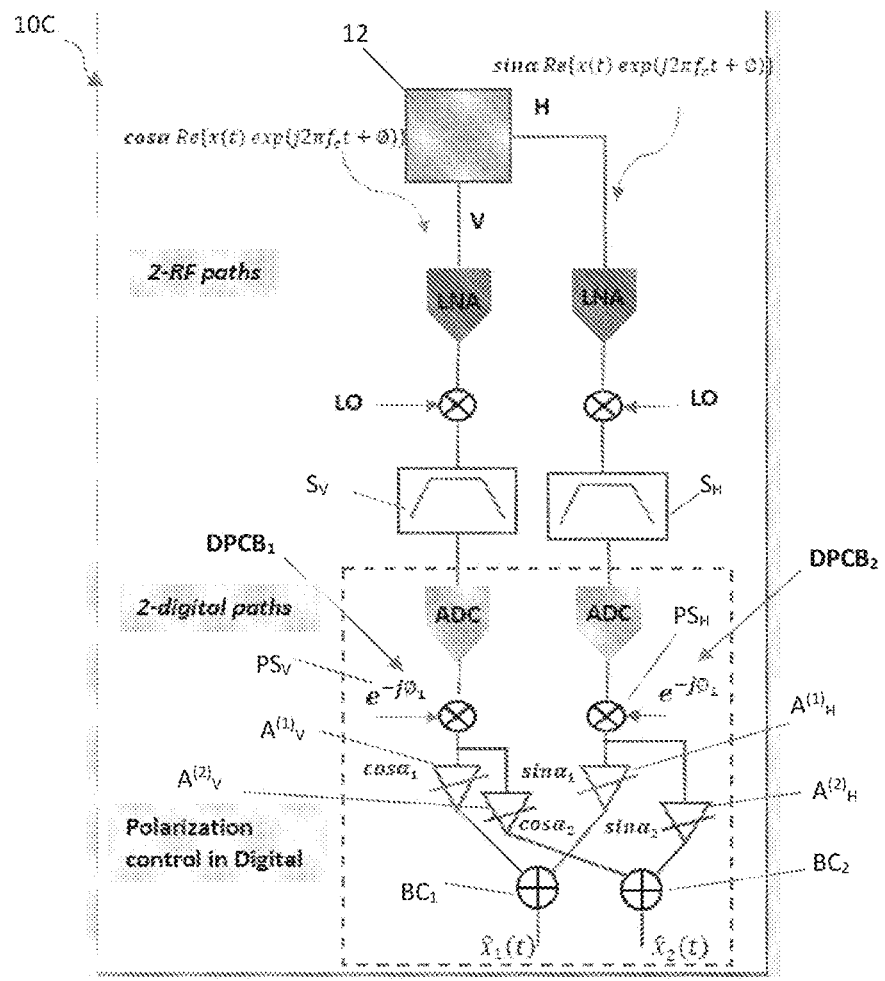
FIG. 1F schematically illustrates the use of digital polarization control approach for linear polarization receiver in a multi-beam configuration of an antenna element.

FIG. 1F schematically illustrates a system configuration 10C utilizing digital polarization control for linear polarization receiver of FIG. 1C (or receiver of FIG. 1D, as will be described further below), in a multi-beam configuration of an antenna element. The antenna element's receiver module 12 receives an input signal x(t) by vertical (V) and horizontal (H) polarization ports. The respective V and H polarization components can be written as:

$$\cos\alpha \, \text{Re}\{x(t)\exp(j2\pi f_c t + \phi)\} \quad (3A)$$

and $$\sin\alpha \, \text{Re}\{x(t)\exp(j2\pi f_c t + \phi)\} \quad (3B)$$

wherein ϕ describes the angle-dependent (beam direction dependent) operative phase of the antenna element in the phase-array antenna.

It should be understood that the signal x(t) being received is actually indicative of two different beams $x_1(t)$ and $x_2(t)$ associated with different sources, being either originated by two different satellites or corresponding to the two different beams of orthogonal polarizations originated at the same satellite. Accordingly, in case of the two different beams originated by two different satellites, the phase parameter ϕ describing angle-dependent operative phase of the antenna element embeds information about phases $\phi_1$ and $\phi_2$ corresponding to the different beams $x_1(t)$ and $x_2(t)$ of different beam directions. In the other case, i.e. the two different beams of orthogonal polarizations originated at the same satellite, the skew factors α1 and α2 differing from one another by 90 degrees describing scan angle dependency of the linear polarization, embeds information corresponding to the different beams $x_1(t)$ and $x_2(t)$.

The received V and H polarization components undergo separate analogue signal processing. This includes two RF paths including analogue circuits of low noise amplifiers (LNAs), and two local oscillators (LOs) performing down conversion from the carrier frequency to the base frequency, as described above. The resulting signal components $S_V$ and $S_H$ enter respective digital signal processing circuits, which include two respective A-to-D converters (ADCs), whose outputs are connected to the two respective digital polarization controlled beam formers $DPCB_1$ and $DPCB_2$. The two beam formers $DPCB_1$ and $DPCB_2$ include, respectively, phase shifters $PS_V$ and $PS_H$, corresponding two pairs of attenuators $A^{(1)}_V$-$A^{(2)}_V$ and $A^{(1)}_H$-$A^{(2)}_H$, and two beam combiners $BC_1$ and $BC_2$. The beam combiners $BC_1$ and $BC_2$ combine, respectively, the outputs of the attenuators $A^{(1)}_V$-$A^{(1)}_H$ and $A^{(2)}_V$-$A^{(2)}_H$, resulting in two digital (noisy) representations $\hat{x}_1(t)$ and $\hat{x}_2(t)$ of the signals corresponding to the beams $x_1(t)$ and $x_2(t)$ being received by the antenna element. It should be understood, although not specifically shown here, that in order to complete the beam forming and restore the beams $x_1(t)$ and $x_2(t)$ by the phased-array antenna, the signal components $\hat{x}_1(t)$ and $\hat{x}_2(t)$ of all the antenna elements are to be separately combined.

It is clear that such linear polarization V-H digital polarization circuit might not be optimal from the implementation point of view. This is at least because it requires, for each antenna element, a pair of A-to-D converters, i.e. doubles the numbers of ADCs, which are relatively large and expensive devices.

Figure 2:
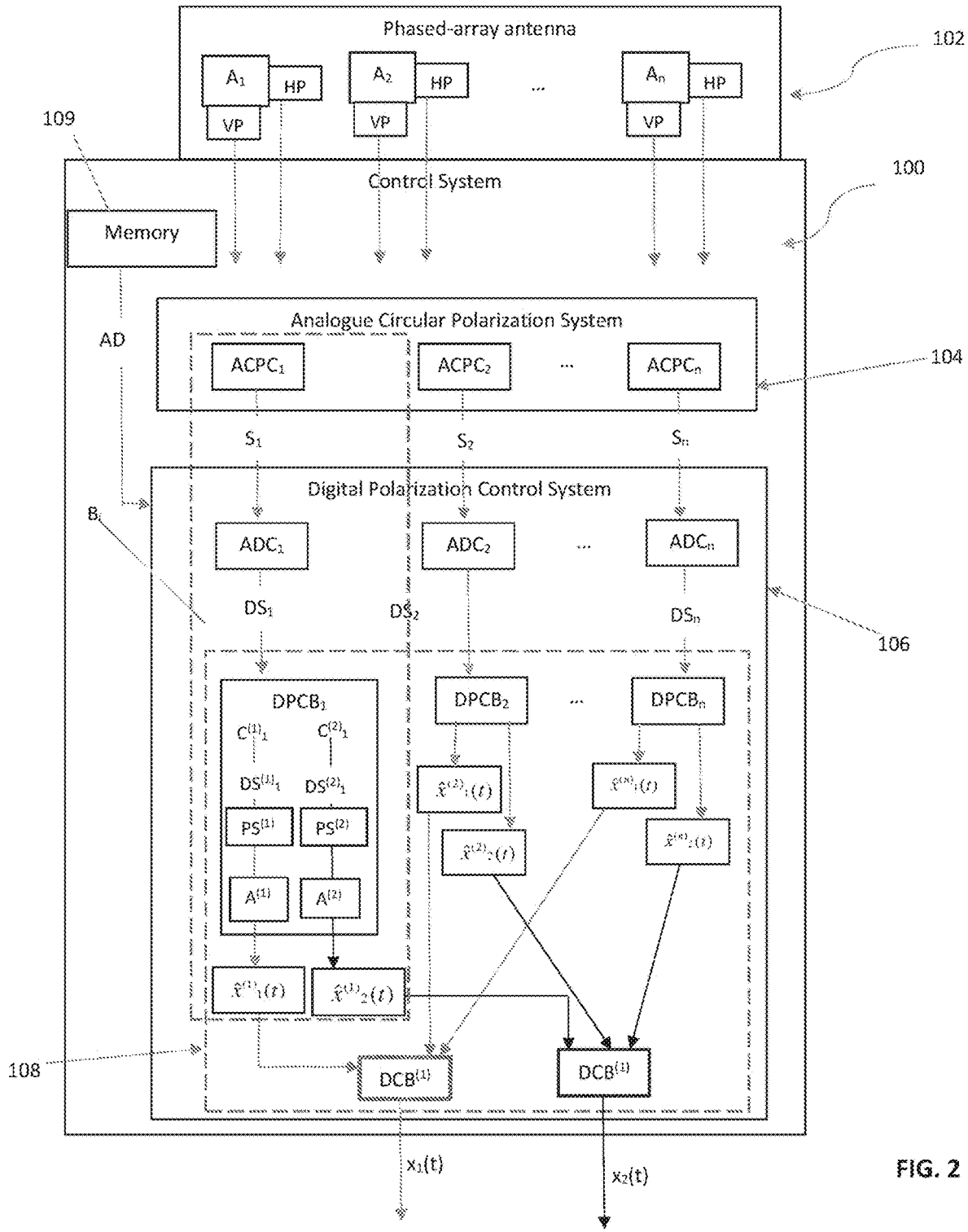
FIG. 2 is a block diagram schematically illustrating the principles of the polarization control technique of the present invention performed by the control system of FIG. 1, exemplified for the receiving mode of operation of the phased array antenna.

Referring now to FIG. 2, there is schematically illustrated, by way of a block diagram, a specific but not limiting example of the configuration and operation of the control system 100 of the invention for controlling operation of the phased-array antenna 102 for the signal receiving operational mode. To facilitate understanding, the same reference numbers/indices are used to indicate the same or functionally similar elements/modules of all the embodiments and examples of the invention. As indicated above, the phased-array antenna 102 may be of any known suitable configuration including an array of N antenna elements $A_1$, $A_2$, ..., $A_n$ each having horizontal and vertical polarization ports HP and VP.

The control system 100 of the invention, being an electronic system connectable to the polarization ports of the antenna elements, includes the analogue circular polarization system 104 and the digital polarization control system 106 including a digital beam forming system 108. The control system 100 includes an array of N of basic units/ blocks, generally $B_i$, each associated with/corresponding to the i-th antenna element. As will be described more specifically further below, the basic block Bi is formed by a respective analogue circular polarization circuit $ACPC_i$, analogue-to-digital convertor $ACD_i$, and a digital polarization controlled beamformers $DPCB_i$.

The analogue circular polarization system 104 includes an array of N analogue circular polarization circuits $ACPC_1$, $ACPC_2, \ldots ACPC_n$, each connectable to the V and H polarization ports of the respective antenna element. As indicated above, according to the multi-beam approach of the present invention, the linear polarized signal is treated (processed/analyzed) as if it is circular polarized, and thus necessary polarization control is applied on the receiver. Hence, each i-th analogue circular polarization circuit $ACPC_i$ (i=1, 2, ... n) of these N analogue circular polarization circuits is configured to convert the $H_i$ and $V_i$ polarization components of the respective i-th antenna element $A_i$ to a circular polarization signal component $S_i$, being either left-hand or right-hand circular polarization signal LHPC or RHPC. The $ACPC_i$ may include the above described circular polarization signal receiver (10B in FIG. 1D), configured to rotate the $H_i$ polarization component by either +90 degrees (left-hand circular polarization) or −90 degrees (right-hand circular polarization) and then combine it with the $V_i$ polarization component; and further includes a local oscillator (LO) performing down conversion from the carrier frequency to the base frequency. By this way, the array of N signals $S_1, S_2, \ldots S_n$, being either left or right circular polarization signals, or including both left and right polarization signals, as will be described more specifically further below, are produced.

It should be understood that the rotations of either +90 degrees or −90 degrees of the polarization component for each antenna element within the phased array are predetermined (being either of a fixed distribution or dynamically changing over time) and are mostly of equal number. To this end, data indicative of the arrangement of antenna elements in the phased-array antenna system is known (previously provided and stored). This data includes inter alia the number N of antenna elements, and the angle-/direction-dependent operative phases of the antenna elements.

The i-th signal $S_i$ corresponding to the beam reception by the i-th antenna element $A_i$ is as follows:

$$\frac{1}{\sqrt{2}} \left( x_1(t) e^{j(\phi^{(i)}_1 + \alpha_1)} + x_2(t) e^{j(\phi^{(i)}_2 + \alpha_2)} \right) \quad (4)$$

wherein $x_1(t)$ and $x_2(t)$ are two different beams being received by the i-th antenna element and having different scan dependent (direction dependent) linear polarizations $\alpha_1$ and $\alpha_2$ associated with different sources, $\phi^{(i)}$ is the antenna element position dependent phase of the i-th antenna element, $\phi^{(i)}_1$ and $\phi^{(i)}_2$ are respective scan angle dependent phases of the i-th antenna element, and $1/\sqrt{2}$ is the 3 dB polarization loss factor (at times termed antenna mismatch factor or antenna receiving factor), as will be described further below.

The so-produced N circular polarization signals $S_1$, $S_2, \ldots S_n$ enter the digital beam forming system 106. The digital polarization control system 106 includes a corresponding array of N analogue-to-digital convertors $ACD_1$, $ACD_2, \ldots ACD_n$, which convert the signals $S_1, S_2, \ldots S_n$ into respective digital circular polarization signals $DS_1$, $DS_2, \ldots DS_n$, and input these digital signals into the digital beam forming system 108.

The beam forming system 108 includes an array of N digital polarization controlled beamformers $DPCB_1$, $DPCB_2, \ldots DPCB_n$; and an array of at least two digital signal combiners $DCB_1$ and $DCB_2$. For simplicity, the configuration of each i-th beamformer $DPCB_i$ in the array of these N beamformers is exemplified in the figure only with respect to $DPCB_1$.

The i-th beamformer $DPCB_i$ is configured to define at least two beam forming channels $C^{(1)}_i$ and $C^{(2)}_i$ (channels $C^{(1)}_1$ and $C^{(2)}_1$ being shown in the figure) associated with at least two, first and second, beams $x_1(t)$ and $x_2(t)$ of different beam directions (and corresponding scan-angle dependent difference in polarization) or of orthogonal polarizations, and is configured to equally split the respective digital circular polarization signal into separate signal components $DS^{(1)}_i$ and $DS^{(2)}_i$ (e.g. $DS^{(1)}_1$ and $DS^{(2)}_1$) to be processed in the beam forming channels $C^{(1)}_i$ and $C^{(2)}_i$ ($C^{(1)}_1$ and $C^{(2)}_1$).

The at least two beam forming channels $C^{(1)}_i$ and $C^{(2)}_i$ associated with the i-th antenna element (or i-th circular polarization signal) are configured to apply phase shifting to the respective digital circular polarization signal component based on data indicative of an m-th beaming direction and corresponding linear polarization (skew factor $\alpha_m$ and the left or right polarization of circular polarization signal of the respective beam), and a respective operative phase ($\phi^{(i)}_m$) associated with the beaming direction and a location of the respective i-th antenna element $A_i$ in the array. In this specific non-limiting example, two, first and second, beam directions are considered, and thus m=1, 2. For example, the beam forming channels $C^{(1)}_1$ and $C^{(2)}_1$ of the digital polarization controlled beamformers $DPCB_1$ (i.e. i=1) perform phase shifting of the digital circular polarization signal components $DS^{(1)}_1$ and $DS^{(2)}_1$ using data indicative of the skew factors $\alpha_1$ and $\alpha_2$ and operative phases $\phi^{(1)}_1$ and $\phi^{(1)}_2$.

To this end, the control system 100 includes a memory 109 or is configured to communicate with an external storage device, as the case may be, where the phased-array antenna related data AD is stored. This antenna related data AD includes data about the arrangement of the antenna elements (number N=1, ... n of antenna elements) and their m-th direction operative phases $\phi^{(1)}_m, \phi^{(2)}_m, \ldots \phi^{(n)}_m$. To this end, the beam forming channels $C^{(1)}_1$ and $C^{(2)}_1$ include respective phase shifters $PS^{(1)}$ and $PS^{(2)}$ and attenuators $A^{(1)}$ and $A^{(2)}$. The phase shifters $PS^{(1)}$ and $PS^{(2)}$ affect the phases of the respective digital signal components $DS^{(1)}_1$ and $DS^{(2)}_1$ by:

$$e^{j(\phi^{(1)}_1 + \alpha_1)} \text{ and } e^{j(\phi^{(1)}_2 + \alpha_1)} (\text{for } i = 1 \text{ and } m = 1, 2) \quad (5)$$

It should be understood that digital signal component corresponding to the analogue signal whose horizontal polarization component is rotated by +90 degree, undergoes rotation by +α (corresponding to the polarization angle), and the digital signal component corresponding to the analogue signal whose horizontal polarization component is rotated by −90 degree undergoes rotation by −α. The $DPCB_1$ thus produces two digital signals $\hat{x}^{(1)}_1(t)$ and $\hat{x}^{(1)}_2(t)$.

Generally, each i-th beam former $DPCB_i$ produces two digital signals $\hat{x}^{(i)}_1(t)$ and $\hat{x}^{(i)}_2(t)$. Each of beam forming channels $C^{(1)}_i$ and $C^{(2)}_i$ is configured to apply the phase shifting to the respective digital circular polarization signal component to thereby form a certain m-th (m=1, 2 in this example) direction beam with a first linear polarization by applying either a "positive" phase shift ($\phi^{(i)}_m+\alpha_m$) to the left circular polarization signal or "opposite" phase shift (($\phi^{(i)}_m-\alpha_m$)) to the right circular polarization signal. Here, $\phi^{(i)}_m$ is the i-th antenna element's position dependent phase required for the beam m-direction forming and $\alpha_m$ is the polarization dependent skew correction associated with the required linear polarization and the beam direction.

These first digital signals $\hat{x}^{(i)}_1(t)$ from all the N beam formers are combined by the digital beam combiner $DBC_1$ into the first beam $x_1(t)$, and the second digital signals $\hat{x}^{(i)}_2(t)$ produced by all the N beam formers are combined by the digital beam combiner $DBC_1$ into the second beam $x_2(t)$. By this, both the beam forming and the polarization control is achieved.

As described above, the data indicative of the skew factor $\alpha$ (or m-th direction skew factor $\alpha_m$) and the relative phase $\phi$ (or m-th direction relative phase $\phi_m$) for the respective antenna element in the array may be previously determined/defined, and stored in a memory/storage utility, to be duly obtained by each of the digital polarization controlled beamformers. Also, data indicative of the carrier frequency fc is pre-stored in the memory/appropriately provided and used to demodulate the circular polarization signal, and, as described above, the A/D conversion is performed with respect to the demodulated circular polarization signal.

It should be understood that in case the terminal antenna receives concurrently at least two beams $x_1(t)$ and $x_2(t)$ from different satellites, i.e. $\alpha_1 \neq \alpha_2$, it would be sufficient that all the basic blocks operate with either left-hand circular polarization configuration or right-hand circular polarization. In case the terminal antenna receives concurrently at least two beams $x_1(t)$ and $x_2(t)$ of different linear polarizations from the same satellite, i.e. $\alpha_1=\alpha_2$, the basic blocks preferably utilize both the left-hand and the right-hand circular polarization configurations. As will be described more specifically further below, and is also mentioned above, the principles of the invention are not limited to the fixed distribution of such basic blocks utilizing "left-hand" or "right-hand" circular polarization control and beam forming, but may be configured for dynamically changing these configurations over time.

Figure 3A:
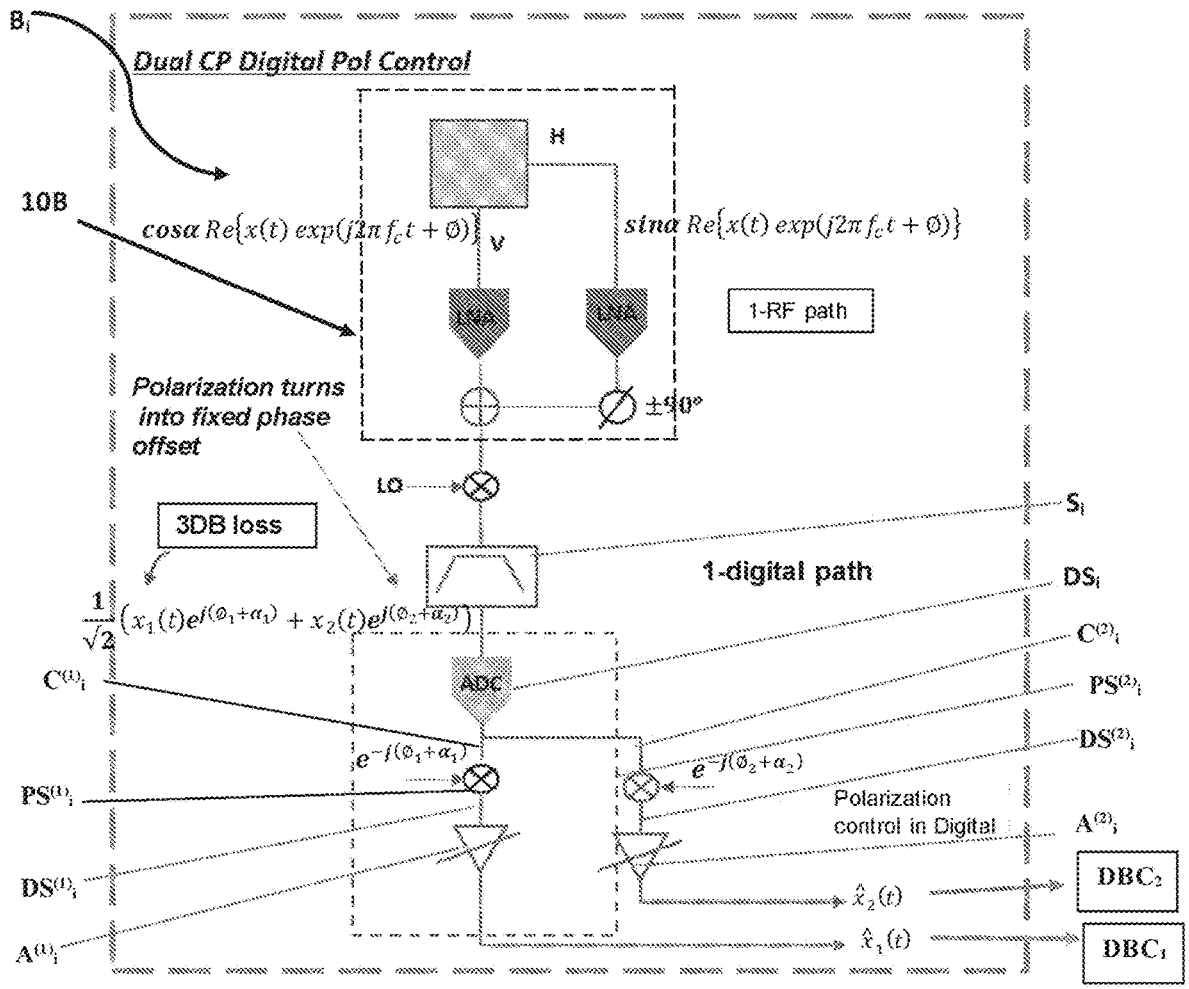
FIGS. 3A and 3B show more specifically two examples, respectively, of the configuration and operation of the polarization control system of the invention.

FIG. 3A schematically illustrates an example of the successive signal processing stages implemented by a basic block (control unit) of a single antenna element according to the above-described technique of the present invention. As shown in the explanatory manner, the basic block $B_i$ includes the analogue circular polarization circuit $ACPC_i$ including the circular polarization signal receiver circuit 10B followed by the local oscillator LO producing a circular polarization signal component $S_i$, being left-hand circular polarization signal in this example, which may be determined by the above expression (4). The basic block $B_i$ further includes the analogue circular analogue-to-digital convertor ACD converting the circular polarization signal component $S_i$ into a digital circular polarization signal $DS_i$ which proceed in a single digital path towards polarization controlled beam forming; and a polarization controlled beamformer $DPCB_i$.

In this connection, the following should be noted. As described above, at the receiver the linear polarized signal is treated as if it is circular polarized, or in other words "a linear polarization receiver" operates to receive a circularly polarized signal. This unavoidably results in a polarization loss factor (at times termed antenna mismatch factor or antenna receiving factor). Keeping in mind that circular polarization is really two orthogonal linear polarized waves 90 degrees out of phase, a linear polarization receiver picks up the in-phase component of the circularly polarized signal. As a result, the linear polarization receiver has a polarization mismatch loss of 0.5 (−3 dB), irrespective of the angle of polarization rotation. Hence the so produced circular polarization signal component $S_i$ is characterized by some polarization loss but likely the polarization turns into fixed phase offset.

The polarization controlled beamformer $DPCB_i$ defines two beam forming channels $C^{(1)}_i$ and $C^{(2)}_i$ (considering two beams being received by the antenna element from the different sources) including two phase shifters $PS^{(1)}_i$ and $PS^{(2)}_i$ applying the following phase shifts $$e^{-j(\phi^{(i)}1+\alpha_1)} \text{ and } e^{-j(\phi^{(i)}2+\alpha_1)}$$

to digital signal components $DS^{(1)}_i$ and $DS^{(2)}_i$ corresponding to the left-hand circular polarized signal $S_i$; and the attenuators $A^{(1)}_i$ and $A^{(2)}_i$ compensating for the signal reduction, as described above.

Figure 4A:
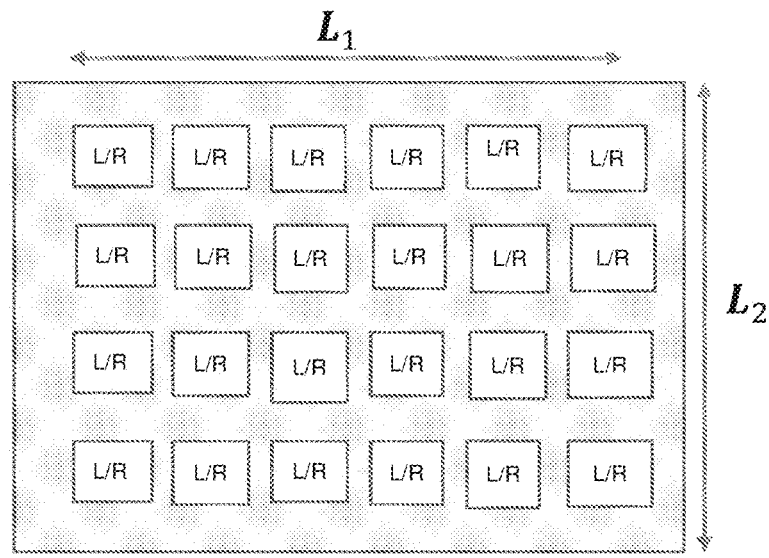
FIGS. 4A and 4B schematically illustrate two examples of the system of the invention utilizing, respectively, left-hand or right-hand circular polarization configuration/operation mode (FIG. 4A), and a combination of both (FIG. 4B) preferably with a random arrangement/operation of the left-hand circular polarization and right-hand circular polarization modes.
Figure 4B:
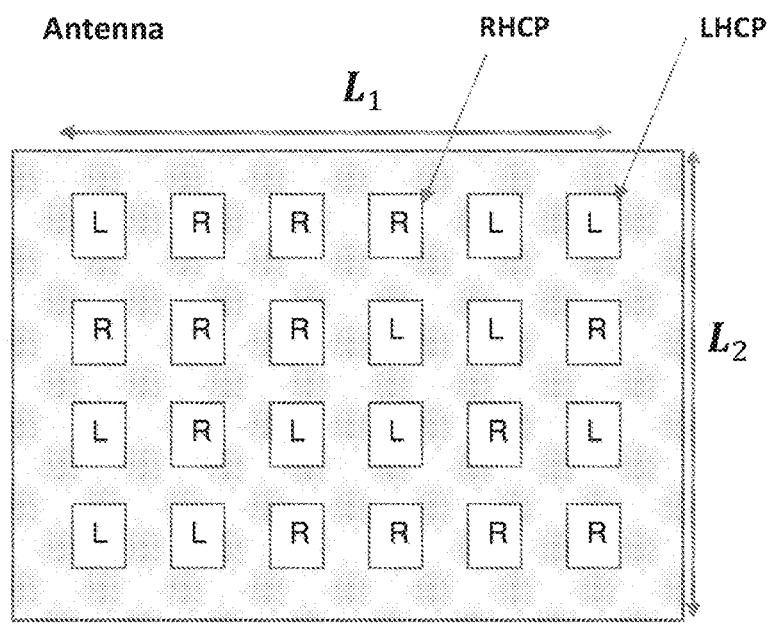

In the specific example of the left-hand circular polarization signal (i.e. the horizontal polarization component rotated by +90 degree) produced by the analogue circular polarization circuit, undergoes rotation by $+\alpha_m$ (corresponding to the polarization angle). The basic block $B_i$ thus produces two digital signals $\hat{x}^{(i)}_1(t)$ and $\hat{x}^{(i)}_2(t)$, which are received by the respective digital beam combiners $DBC_1$ and $DBC_2$ to complete the beam forming and polarization control, as described above. In case of right-hand circular polarization, the phase shifters of the basic block apply $-\alpha_m$ rotation. In some embodiments, combination of left-hand and right-hand circular polarization may be used. The corresponding examples are schematically illustrated in FIGS. 4A and 4B, showing arrays of antenna elements' basic blocks all operating with either left-hand circular polarization configuration or right-hand circular polarization configuration (FIG. 4A), and an array of antenna elements' basic blocks formed by two sub-arrays of respectively left-hand and right-hand circular polarization configurations (FIG. 4B).

It should be thus understood that the principles of the invention are not limited to the fixed distribution of such basic blocks utilizing "left-hand" or "right-hand" circular polarization control and beam forming, but may be configured for dynamically changing these configurations over time.

Figure 3B:
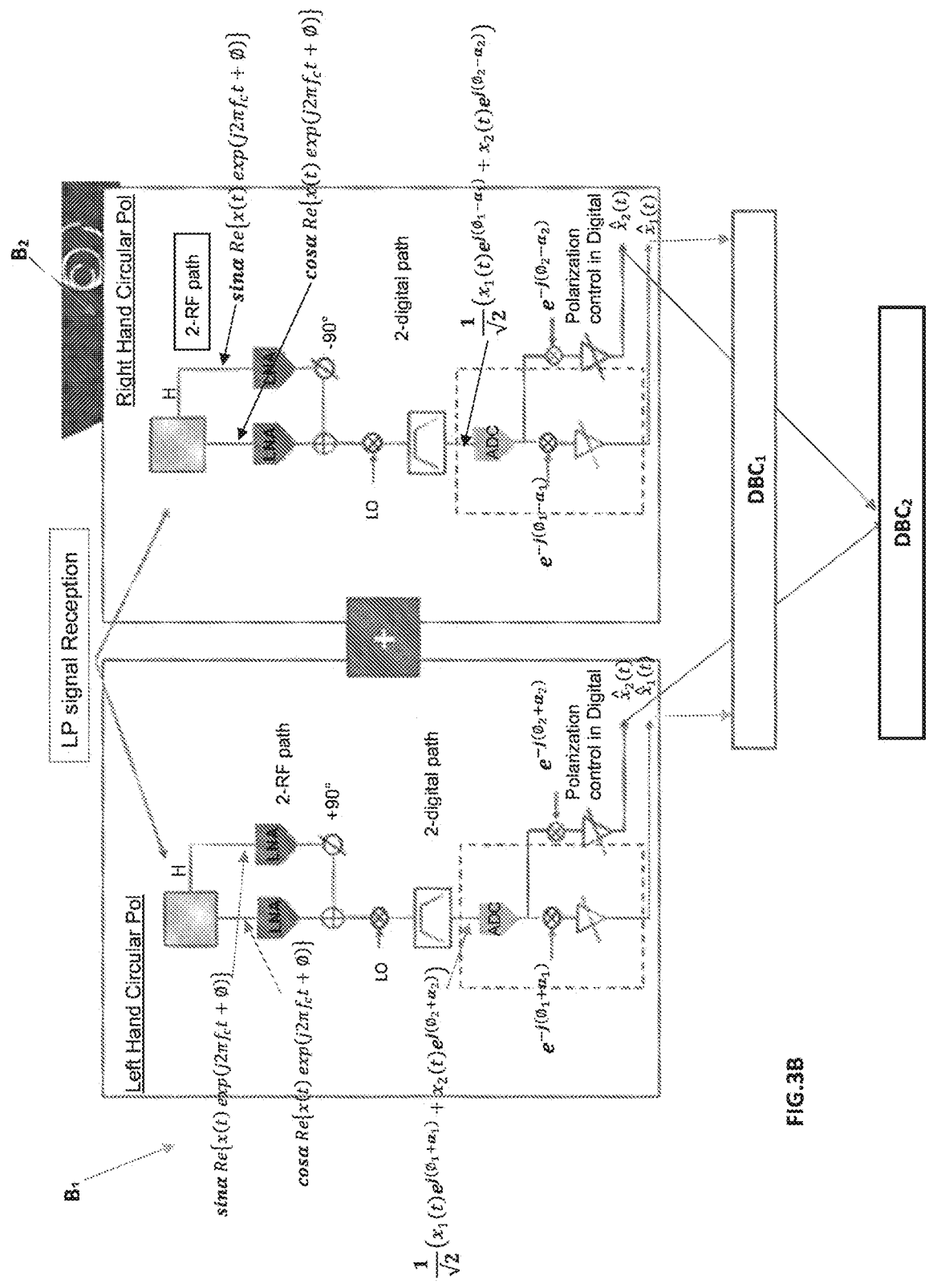

Reference is now made to FIG. 3B illustrating more specifically an example of the configuration and operation of two basic blocks $B_1$ and $B_2$, associated with two antenna elements, and implementing respectively the left-hand and right-hand circular polarization configurations. The illustration is self-explanatory. As shown the basic blocks $B_1$ and $B_2$ apply opposite phase shifts ($\phi_1+\alpha_m$) to the left-hand circular polarization signal and ($-(\phi_1+\alpha_m)$) to the right-hand circular polarization signal.

Turning back to FIG. 4A, it should be noted that in some other embodiments the control system may be formed by two separate electronic systems associated with two separate antenna arrays, operating in, respectively, left-hand and the right-hand circular polarization configurations.

Turning back to FIG. 4B showing the use of a combination of two sub-arrays of basic blocks operating in, respectively, the left-hand and the right-hand circular polarization configurations. As indicated above, this operational mode is preferred for the case of concurrent receipt of the different signals from the same satellite having different linear polarizations.

Indeed, let us consider two linearly polarized beams transmitted at same frequency with the orthogonal polarizations:

$$\alpha_1, \alpha_2 \forall \alpha_2 = \alpha_1 + 90^\circ$$

It can be shown that the received signal is sum of these two orthogonal polarized signal components:

$$Z = (x_R^1(t)\cos\alpha_1 - x_I^1(t)\sin\alpha_1)\cos(2\pi f_c t) + +(-x_R^1(t)\sin\alpha_1 - x_I^1(t)\cos\alpha_1)$$

$$\sin(2\pi f_c t) + +(x_R^2(t)\cos\alpha_2 - x_I^2(t)\sin\alpha_2)\cos(2\pi f_c t) +$$

$$(-x_R^2(t)\sin\alpha_2 - x_I^2(t)\cos\alpha_2)\sin(2\pi f_c t)$$

Therefore at the baseband we have:

$$Z_B = (x_R^1(t)\cos\alpha_1 - x_I^1(t)\sin\alpha_1) +$$

$$j(-x_R^1(t)\sin\alpha_1 - x_I^1(t)\cos\alpha_1) + +(x_R^2(t)\cos\alpha_2 - x_I^2(t)\sin\alpha_2) +$$

$$(-x_R^2(t)\sin\alpha_2 - x_I^2(t)\cos\alpha_2)$$

$$\begin{bmatrix} \tilde{x}_R(t) \\ \tilde{x}_I(t) \end{bmatrix} = \begin{bmatrix} \cos\alpha_1 & -\sin\alpha_1 \\ \sin\alpha_1 & \cos\alpha_1 \end{bmatrix} \begin{bmatrix} x_R^1(t) \\ x_I^1(t) \end{bmatrix} + \begin{bmatrix} \cos\alpha_2 & -\sin\alpha_2 \\ \sin\alpha_2 & \cos\alpha_2 \end{bmatrix} \begin{bmatrix} x_R^2(t) \\ x_I^2(t) \end{bmatrix}$$

After tuning the receipt of one signal and de-rotating the received signal by the linear polarization angle of said signal, we have:

$$\begin{bmatrix} \cos\alpha_1 & \sin\alpha_1 \\ -\sin\alpha_1 & \cos\alpha_1 \end{bmatrix} \begin{bmatrix} \tilde{x}_R(t) \\ \tilde{x}_I(t) \end{bmatrix} == \begin{bmatrix} x_R^1(t) \\ x_I^1(t) \end{bmatrix} + \begin{bmatrix} \cos\alpha_1 & \sin\alpha_1 \\ -\sin\alpha_1 & \cos\alpha_1 \end{bmatrix} \begin{bmatrix} \cos\alpha_2 & -\sin\alpha_2 \\ \sin\alpha_2 & \cos\alpha_2 \end{bmatrix}$$

$$\begin{bmatrix} x_R^2(t) \\ x_I^2(t) \end{bmatrix} == \begin{bmatrix} x_R^1(t) \\ x_I^1(t) \end{bmatrix} + \begin{bmatrix} \cos\Delta\alpha & -\sin\Delta\alpha \\ \sin\Delta\alpha & \cos\Delta\alpha \end{bmatrix} \begin{bmatrix} x_R^2(t) \\ x_I^2(t) \end{bmatrix}$$

Here, $$\begin{bmatrix} \cos\Delta\alpha & -\sin\Delta\alpha \\ \sin\Delta\alpha & \cos\Delta\alpha \end{bmatrix} \begin{bmatrix} x_R^2(t) \\ x_I^2(t) \end{bmatrix}$$

is the cross polarization interference related factor.

Keeping in mind that the two input linearly polarized beams are transmitted at same frequency and have orthogonal polarizations, we have:

$$\begin{bmatrix} \sin\alpha_1 & \cos\alpha_1 \\ -\cos\alpha_1 & \sin\alpha_1 \end{bmatrix} \begin{bmatrix} \tilde{x}_R(t) \\ \tilde{x}_I(t) \end{bmatrix} = \begin{bmatrix} x_R^1(t) \\ x_I^1(t) \end{bmatrix} + \begin{bmatrix} x_I^2(t) \\ -x_R^2(t) \end{bmatrix} = \begin{bmatrix} x_R^1(t) + x_I^2(t) \\ x_I^1(t) & -x_R^2(t) \end{bmatrix}$$

In the complex domain:

$$\tilde{x}_R(t) + j\tilde{x}_I(t) = e^{j\alpha_1}(x_R^1(t) + jx_I^1(t)) + e^{j\alpha_2}(x_R^2(t) + jx_I^2(t))$$

$$e^{-j\alpha_1}(\tilde{x}_R(t) + j\tilde{x}_I(t)) = (x_R^1(t) + jx_I^1(t)) + e^{j(\alpha_2-\alpha_1)}(x_R^2(t) + jx_I^2(t)) ==$$

$$(x_R^1(t) + jx_I^1(t)) + e^{j\Delta\alpha}(x_R^2(t) + jx_I^2(t))$$

wherein $e^{j\Delta\alpha}$ ($x_R^2(t)+jx_I^2(t)$) describes the cross polarization interference.

The above equations show that there is no rejection of orthogonal polarization; no polarization can be rejected, but different beams (from different satellites) with different polarization can be rejected effectively if the antenna is large enough and has narrow beamwidth. The cross polarization interference from adjacent satellites is rejected.

The following is the explanation of the solution for rejecting orthogonal polarization: The RF signals received from the RHCP and LHCP patches:

$$Z^{RHCP} =$$

$$(x_R(t)\cos\alpha - x_I(t)\sin\alpha)\cos(2\pi f_c t) + +(-x_R(t)\sin\alpha - x_I(t)\cos\alpha)\sin(2\pi f_c t)$$

$$Z^{LHCP} = (x_R(t)\cos\alpha + x_I(t)\sin\alpha)$$

$$\cos(2\pi f_c t) + +(x_R(t)\sin\alpha - x_I(t)\cos\alpha)\sin(2\pi f_c t) \Rightarrow Z_B^{LHCP} =$$

$$(x_R(t)\cos\alpha + x_I(t)\sin\alpha) - j(x_R(t)\sin\alpha - x_I(t)\cos\alpha) \Rightarrow \tilde{x}_R^{LHCP}(t) + j\tilde{x}_I^{LHCP}(t) =$$

$$e^{-j\alpha}(x_R(t) + jx_I(t)) \Rightarrow x_R(t) + jx_I(t) = e^{j\alpha}(\tilde{x}_R^{LHCP}(t) + j\tilde{x}_I^{LHCP}(t))$$

Thus, for the RHCP configuration:

$$\hat{x}_R^1(t) + j\hat{x}_I^1(t) = e^{j\alpha_1}(\tilde{x}_R^{RHCP}(t) + j\tilde{x}_I^{RHCP}(t))$$

$$Xpol^{RHCP} = e^{j\Delta\alpha}(x_R^2(t) + jx_I^2(t))$$

and for the LHCP configuration:

$$\hat{x}_R^1(t) + j\hat{x}_I^1(t) = e^{-j\alpha_1}(\tilde{x}_R^{LHCP}(t) + j\tilde{x}_I^{LHCP}(t))$$

$$Xpol^{LHCP} = e^{-j\Delta\alpha}(x_R^2(t) + jx_I^2(t))$$

In the combined beam:

$$Xpol^{RHCP} + Xpol^{LHCP} = 2\cos\Delta\alpha(x_R^2(t) + jx_I^2(t))$$

For the case of $\Delta\alpha=\pi/2$:

$$Xpol^{RHCP} + Xpol^{LHCP} = 0$$

$$Cpol^{RHCP} + Cpol^{LHCP} = 2(x_R^1(t) + jx_I^1(t))$$

Thus, if the antenna is partitioned equally into LHCP and RHCP, then the combined effect of depolarization (via rotation in baseband) at each element and beamforming (combining), eliminates Xpol factor due to orthogonal polarization components.

In this case, irrespectively of whether the fixed distribution of the LHCP and RHCP basic blocks is used or dynamically changed over time, the arrangement is preferably random, e.g. the left-hand and right-hand operational modes are randomly distributed between the array of basic blocks, either physically or electronically within the same operational session. This randomization improves cross polarization rejection, and improves the antenna radiation pattern.

Figure 4C:
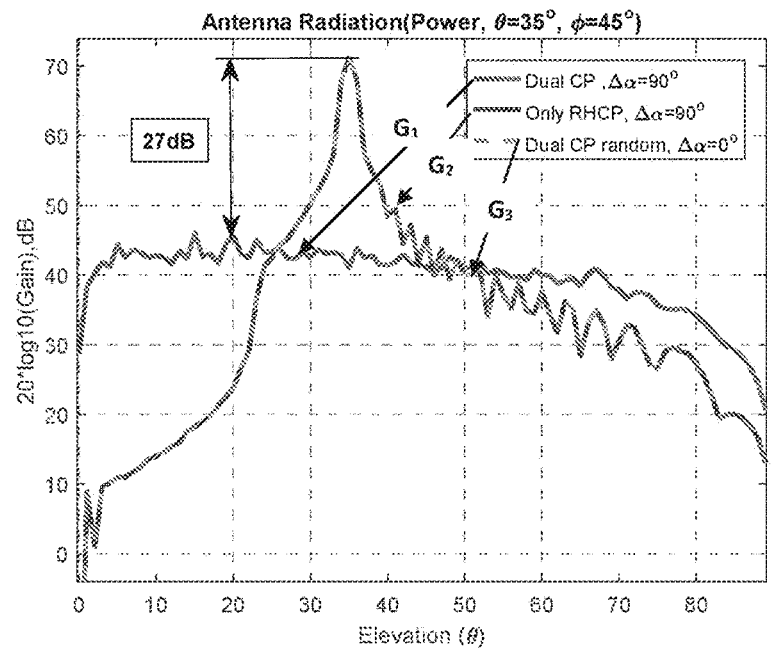
FIG. 4C is a graphical illustration of the advantageous of the random arrangement.

The above is exemplified in FIG. 4C showing three antenna patterns G1, G2 and G3 corresponding to the use of, respectively, dual circular polarization elements configuration with $\Delta\alpha=90°$, the use of only right-hand circular polarization elements with $\Delta\alpha\approx90°$, and random arrangement of dual LHCP and RHCP elements. As can be seen, the random arrangement of LHCP and RHCP elements improves the antenna pattern (i.e. good cross polarization rejection is obtained which is flat. Moreover, if the number of LHCP and RHCP patches are identical, deep notch in main pointing direction is obtained.

Indeed, as described above, treatment of linearly polarized signal as if it is circularly polarized results in polarization loss. Hence, using only RHCP or LHCP (which is sufficient in case the different signals are associated with different sources) would result in some polarization loss and accordingly the side lobes rejection close to the main beam might be poor. When using both the RHCP and LHCP in the alternating configurations, higher rejection of the side lobes can be obtained, improving the antenna radiation pattern. Random (disordered) distribution of the LHCP and RHCP blocks/channels even more improves the antenna radiation pattern in this respect (i.e. further reducing polarization dependent grating lobes.

More specifically, the use of "ideal" linear polarization receiver provides the ideal antenna gain $G_{Ideal}(\Delta\Phi)$ as a function of phase difference $\Delta\Phi$:

$$G_{Ideal}(\Delta\Phi) = \cos(\Delta\alpha)\frac{\sin(\pi L\Delta\Phi/2)}{\sin(\pi\Delta\Phi/2)}$$

Here, $\cos\Delta\alpha$ describes the polarization rejection factor, namely the attenuation that the signal polarized at a polarization which deviates by $\Delta\alpha$ from the wanted signal, and $$\frac{\sin(\pi L\Delta\Phi/2)}{\sin(\pi\Delta\Phi/2)}$$

describes the antenna gain radiation pattern along the antenna array of dimension L.

The antenna gain, $G_{Dual\ CP}$, for the antenna utilizing the dual circular polarization controlled receiver used in the present invention is a function of both the phase and polarization differences, $(\Delta\Phi, \Delta\alpha)$, and can be written as:

$$G_{DualCP}(\Delta\Phi, \Delta\alpha) = \frac{1}{\sqrt{2}}\left(\frac{\cos(\pi\Delta\Phi/2 - \Delta\alpha)}{\cos(\pi\Delta\Phi/2)}\right)\frac{\sin(\pi L\Delta\Phi/2)}{\sin(\pi\Delta\Phi/2)}$$

Here, $$\frac{\sin(\pi L\Delta\Phi/2)}{\sin(\pi\Delta\Phi/2)}$$

describes the antenna gain radiation pattern along the antenna array of dimension L; and $$\frac{1}{\sqrt{2}}\left(\frac{\cos(\pi\Delta\Phi/2 - \Delta\alpha)}{\cos(\pi\Delta\Phi/2)}\right)$$

describes the polarization rejection factor. Close to the main lobe of the antenna pattern, the polarization rejection is identical to that of the "ideal" linear polarization.

More specifically, let us consider the dual circular polarization configuration with multi-beam linear polarization control. Received signal at the two ports of $n^{th}$ antenna element are:

for the V port:

$$V_n(t) = \cos\alpha_1 \text{Re}\{x_1(t)e^{(j2\pi f_c t + \phi_n^1)}\} + \cos\alpha_2 \text{Re}\{x_2(t)e^{(j2\pi f_c t + \phi_n^2)}\} +$$
$$\cos\alpha_3 \text{Re}\{x_3(t)e^{(j2\pi f_c t + \phi_n^3)}\} + \ldots + \cos\alpha_m \text{Re}\{x_m(t)e^{(j2\pi f_c t + \phi_n^m)}\}$$
$$V_n = V_n^1(\alpha_1, \varphi_n^1) + V_n^2(\alpha_2, \varphi_n^2) + V_n^3(\alpha_3, \varphi_n^3) + \ldots + V_n^m(\alpha_m, \varphi_n^m)$$

for the H port:

$$H_n(t) = \sin\alpha_1 \text{Re}\{x_1(t)e^{(j2\pi f_c t + \varphi_n^1)}\} + \sin\alpha_2 \text{Re}\{x_2(t)e^{(j2\pi f_c t + \varphi_n^2)}\} +$$
$$\sin\alpha_3 \text{Re}\{x_3(t)e^{(j2\pi f_c t + \varphi_n^3)}\} + \ldots \pm \sin\alpha_m \text{Re}\{x_m(t)e^{(j2\pi f_c t + \varphi_n^m)}\}$$
$$H_n = H_n^1(\alpha_1, \varphi_n^1) + H_n^2(\alpha_2, \varphi_n^2) + H_n^3(\alpha_3, \varphi_n^3) + \ldots + H_n^m(\alpha_m, \varphi_n^m)At$$

the output of the circular antenna or analog RF path/circuit, the two ports are be combined after rotating H-port component by +/−90°:

$$V_n + H_n(\angle 90) = V_n^1(\alpha_1, \varphi_n^1) + V_n^2(\alpha_2, \varphi_n^2) + V_n^3(\alpha_3, \varphi_n^3) +$$
$$\ldots + V_n^m(\alpha_m, \varphi_n^m) + H_n^1(\alpha_1, \varphi_n^1, \angle 90) + H_n^2(\alpha_2, \varphi_n^2, \angle 90) +$$
$$H_n^3(\alpha_3, \varphi_n^3, \angle 90) + \ldots + H_n^m(\alpha_m, \varphi_n^m, \angle 90) + w_n(t)$$
$$VH_n^{RHCP} = \frac{1}{\sqrt{2}}\Big(\text{Re}\{x_1(t)e^{(j(2\pi f_c t + \varphi_n^1 + \alpha_1))}\} +$$
$$\text{Re}\{x_2(t)e^{(j(2\pi f_c t + \varphi_n^2 + \alpha_2))}\} + \ldots + \text{Re}\{x_m(t)e^{(j(2\pi f_c t + \varphi_n^2 + \alpha_2))}\}\Big) + w_n(t)$$

At baseband the signal is:

$$y_n^{RHCP} =$$
$$\frac{1}{\sqrt{2}}\Big(x_1(t)e^{(j(\varphi_n^1 + \alpha_1))} + x_2(t)e^{(j(\varphi_n^2 + \alpha_2))} + \ldots + x_m(t)e^{(j(\varphi_n^m + \alpha_m))}\Big) + w_n(t)$$

Similarly, for e.g. (n+1)th antenna element, the signal is combined as LHCP:

$$y_{n+1}^{LHCP}(t) =$$
$$\frac{1}{\sqrt{2}}\Big(x_1(t)e^{(j(\varphi_{n+1}^1 - \alpha_1))} + x_2(t)e^{(j(\varphi_{n+1}^2 - \alpha_2))} + \ldots + x_m(t)e^{(j(\varphi_{n+1}^m - \alpha_m))}\Big) + w_{n+1}(t)$$

Let us consider the antenna of size L=2N. Then, after beamforming for signal $x_1(t)$, we have:

$$\hat{x}_1(t) = \sum_{k=0}^{N-1} e^{(-j(\varphi^1_{2k}+\alpha_1))} y_{2k}^{RHCP}(t) + \sum_{k=0}^{N-1} e^{(-j(\varphi^1_{2k+1}+\alpha_1))} y_{2k+1}^{LHCP}(t)$$

$$\hat{x}_1(t) = e^{(-j\alpha_1)} \sum_{k=0}^{N-1} e^{(-j\varphi^1_{2k})} y_{2k}^{RHCP}(t) + e^{(j\alpha_1)} \sum_{k=0}^{N-1} e^{(-j(\varphi^1_{2k+1}))} y_{2k+1}^{LHCP}(t)$$

Thus, Beam 1, Beam2 . . . Beam m can be written:

$$\hat{x}_1(t) =$$

$$\frac{1}{\sqrt{2}}\left\{2Nx_1(t) + \sum_{i\neq 1}\left(e^{(-j\Delta\alpha_{1i})} + e^{(j\Delta\alpha_{1i})}e^{(j\pi\Delta\Phi_{1i})}\right)\frac{\sin(\pi N\Delta\Phi_{1i})}{\sin(\pi\Delta\Phi_{1i})}\right\} + \sum_{k=0}^{2N-1} w_k(t)$$

$$\hat{x}_2(t) =$$

$$\frac{1}{\sqrt{2}}\left\{2Nx_2(t) + \sum_{i\neq 2}\left(e^{(-j\Delta\alpha_{2i})} + e^{(j\Delta\alpha_{2i})}e^{(j\pi\Delta\Phi_{2i})}\right)\frac{\sin(\pi N\Delta\Phi_{2i})}{\sin(\pi\Delta\Phi_{2i})}\right\} + \sum_{k=0}^{2N-1} w_k(t)$$

$$\hat{x}_m(t) =$$

$$\frac{1}{\sqrt{2}}\left\{2Nx_m(t) + \sum_{i\neq 2}\left(e^{(-j\Delta\alpha_{mi})} + e^{(j\Delta\alpha_{mi})}e^{(j\pi\Delta\Phi_{mi})}\right)\frac{\sin(\pi N\Delta\Phi_{2i})}{\sin(\pi\Delta\Phi_{2i})}\right\} + \sum_{k=0}^{2N-1} w_k(t)$$

wherein $\Delta\alpha_{1i} = \alpha_i - \alpha_1$, and $\Delta\varphi_{1i} = \varphi_i - \varphi_1$.

As indicated above, the carrier-to-noise (C/N) gain of antenna suffers loss of 3 dB:

$$\frac{C}{N} = \frac{1}{2}(4N^2\sigma_s^2/2N\sigma^2) = \frac{1}{2}(2N\sigma_s^2/\sigma_w^2) = \frac{1}{2}(L\sigma_s^2/\sigma_w^2)$$

Here, the ratio $$(L\sigma_s^2/\sigma_w^2)$$

describes 3 dB loss in C/N due to power combiner (V and H signal components being out of phase).

Let us consider grating lobes in the antenna pattern of signal:

$$\hat{x}_1(t) = \frac{1}{\sqrt{2}}$$

$$\left\{2Nx_1(t) + \sum_{i\neq 1}\left(e^{(-j\Delta\alpha_{1i})} + e^{(j\Delta\alpha_{1i})}e^{(j\pi\Delta\Phi_{1i})}\right)\frac{\sin(\pi N\Delta\Phi_{1i})}{\sin(\pi\Delta\Phi_{1i})}x_i(t)\right\} + \sum_{k=0}^{2N-1} w_k(t)$$

$$\hat{x}_1(t) = \frac{1}{\sqrt{2}}\left\{2Nx_1(t) + \right.$$

$$\left.\sum_{i\neq 1} e^{(j\pi\Delta\Phi_{1i}/2)}\left(\frac{\cos(\pi\Delta\Phi_{1i}/2 - \Delta\alpha_{1i})}{\cos(\pi\Delta\Phi_{1i}/2)}\right)\frac{\sin(\pi L\Delta\Phi_{1i}/2)}{\sin(\pi\Delta\Phi_{1i}/2)}x_i(t)\right\} + \sum_{k=0}^{2N-1} w_k(t)$$

Here, $\cos(\pi\Delta\Phi_{1i}/2)$ corresponds to grating lobes when $\Delta\Phi_{1i} = \pm 1$, for $\Delta\alpha_{1i} > 70°$;

$$\frac{\cos(\pi\Delta\Phi_{1i}/2 - \Delta\alpha_{1i})}{\cos(\pi\Delta\Phi_{1i}/2)}$$

is the polarization rejection factor; and $$\frac{\sin(\pi L\Delta\Phi_{1i}/2)}{\sin(\pi\Delta\Phi_{1i}/2)}$$

describes antenna gain reduction of ideal antenna. Close to the main lobe of the beam, the polarization rejection factor is identical to the ideal linear polarization. Outside the main lobe, the antenna gain assists in rejecting of different linear polarized beams from different satellites.

Thus, the antenna pattern (grating lobes) can be improved (due to good rejection of Xpol) by randomizing the distribution of LHCP and RHCP blocks/elements over the antenna, while preferably using the equal number of LHCP and RHCP blocks. The inventors have also shown that further averaging can be obtained by gradually changing the distribution in a deterministic way to provide stochastic averaging.

Figure 5A:
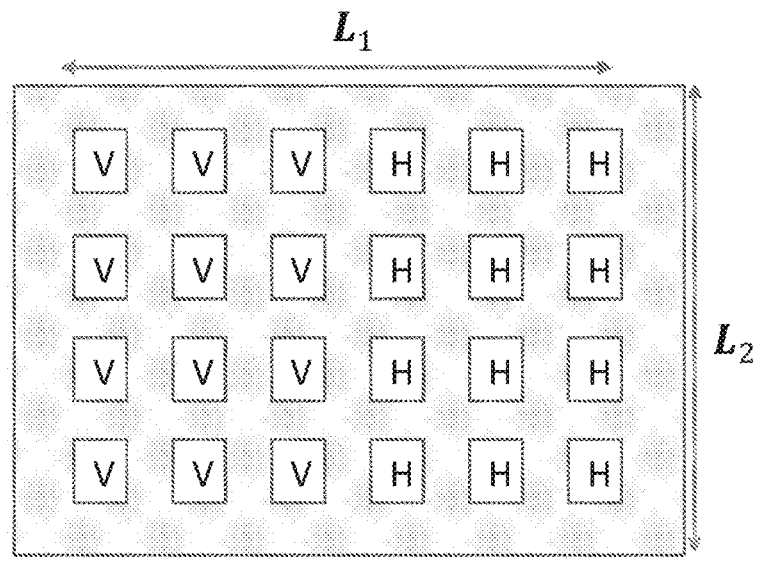
FIGS. 5A and 5B schematically illustrate two examples of the system of the invention utilizing, respectively, two separate dedicated panels with V and H receiving ports, and V and H ports randomly distributed across different antenna elements, both aimed at solving the grating lobe associated problem.
Figure 5B:
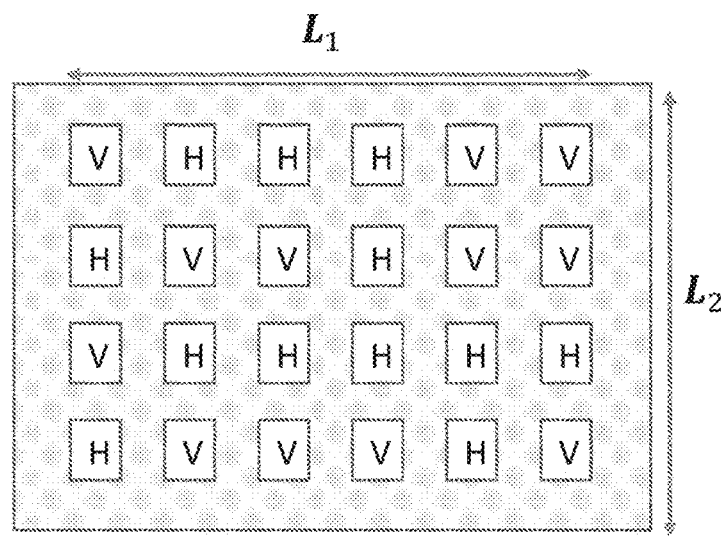

The inventors have further shown that, alternatively or additionally, grating lobe associated problem can be overcome by utilizing two separate dedicated panels with V and H receiving ports, or utilizing V and H ports randomly distributed across different antenna elements. These configurations are schematically shown in FIGS. 5A and 5B.

The invention also provides for dynamically switching between analog and digital polarization control circuits and provides for controlling the gain of each beam dynamically. This technique provides flexibility to switch/shift between the two schemes (operational modes) of using Analog Linear Polarization control and treating the Linear Polarized signal as combination of LHCP and RHCP in Analog circuit/scheme, and then performing the beamforming with correct polarization phase rotation in digital mode/scheme. Such switch/shift between the different schemes may be performed dynamically, e.g. for single beam vs multibeam reception. In this connection reference is made to FIGS. 6A-6D and 7A-7D.

Figure 6A:
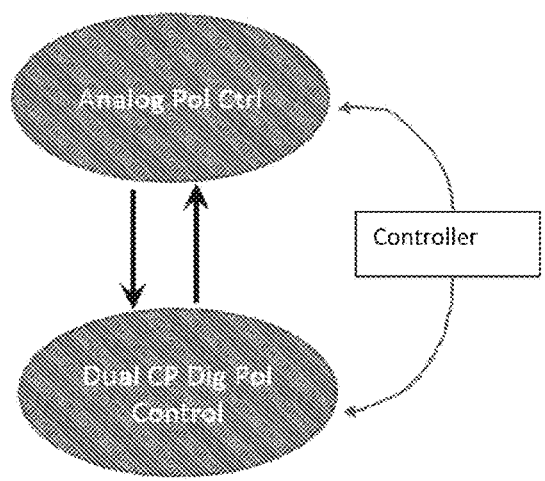
Figure 6B:
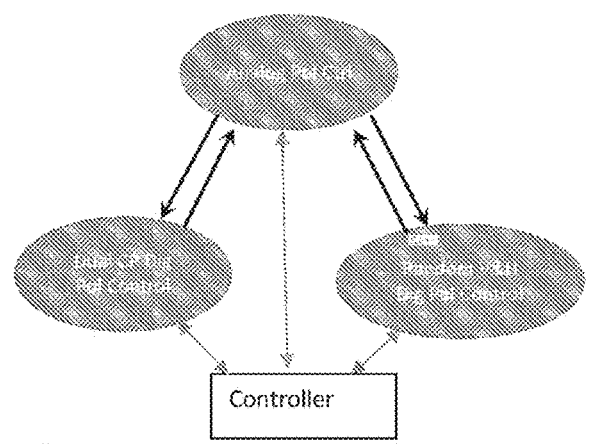

As schematically shown in FIG. 6A, the multiple antenna elements may include first and second antenna elements associated with analogue polarization control circuits and dual circular polarization digital circuits, and a controller. The latter is configured and operable to selectively operate either one of the first and second antenna elements, or a combination of both. FIG. 6B exemplifies that the multiple antenna elements may further include a third group of antenna elements with random V and H ports and digital polarization control circuits. The controller operates to selectively operate either one of the first, second and third antenna elements, or any combination of them. The first group of antenna elements associated with the analogue polarization control circuits may be used for receiving/treating a single beam or linear polarized multibeams with relatively small polarization spread, or a two-beam subarray operating being either both received as linear polarized or one as linear polarized and the other as circular polarized (as described above). The antenna elements associated with the dual circular polarization digital circuits, as well as those associated with random V and H ports and digital polarization control circuits can be used for receiving linear polarized multibeams with relatively large polarization spread, including a combination of two linear polarized signals and linear and circular polarized signals.

Figure 6C:
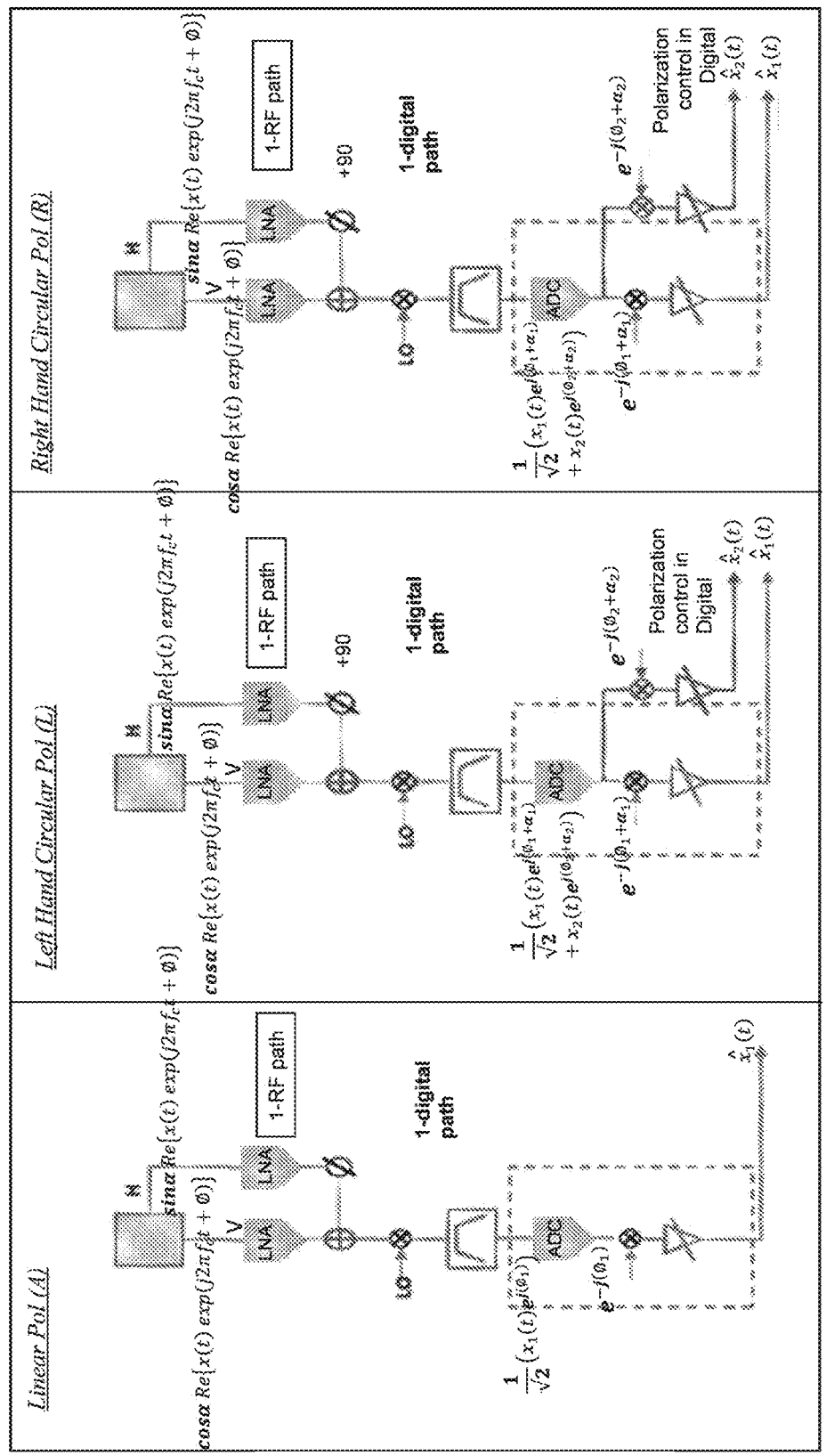

FIG. 6C schematically illustrates how the single-beam analogue linear polarization control circuit (providing a single output beam $\hat{x}_1(t)$) can be selectively used in combination with a Left Hand Circular Polarization circuit (digital polarization control) and Right Hand Circular Polarization circuit (digital polarization control).

For dual circular polarization and digital polarization control circuit, there is 3 dB loss in the gain-to-noise-temperature ratio for antenna of a given size, for all the beams. Since polarization control in an RF chip/circuit can be switched to linear or circular by changing configuration (using software-based control), the loss can be asymmetrically distributed by using a mixture/combination of both the linear polarization in RF and the circular polarization. For example, Beam 1 can be treated as a single beam with partially analog polarization control and partially dual circular polarization digital control; and Beams 2-Beams M can be treated using dual circular polarization digital control; and Beams 2-Beams M can be treated using. More specifically, if one particular beam with its polarization needs to be prioritized, then the RF chains corresponding to some of the antenna elements can be configured and operated to perform linear polarization for those particular antenna elements, while other elements are configured and operated to perform combination of right hand circular and left hand circular polarization. This mixed/combined polarization control in RF allows for prioritization of beams, such that prioritized beam has smaller loss in SNR compared to lower priority beams.

Figure 6D:
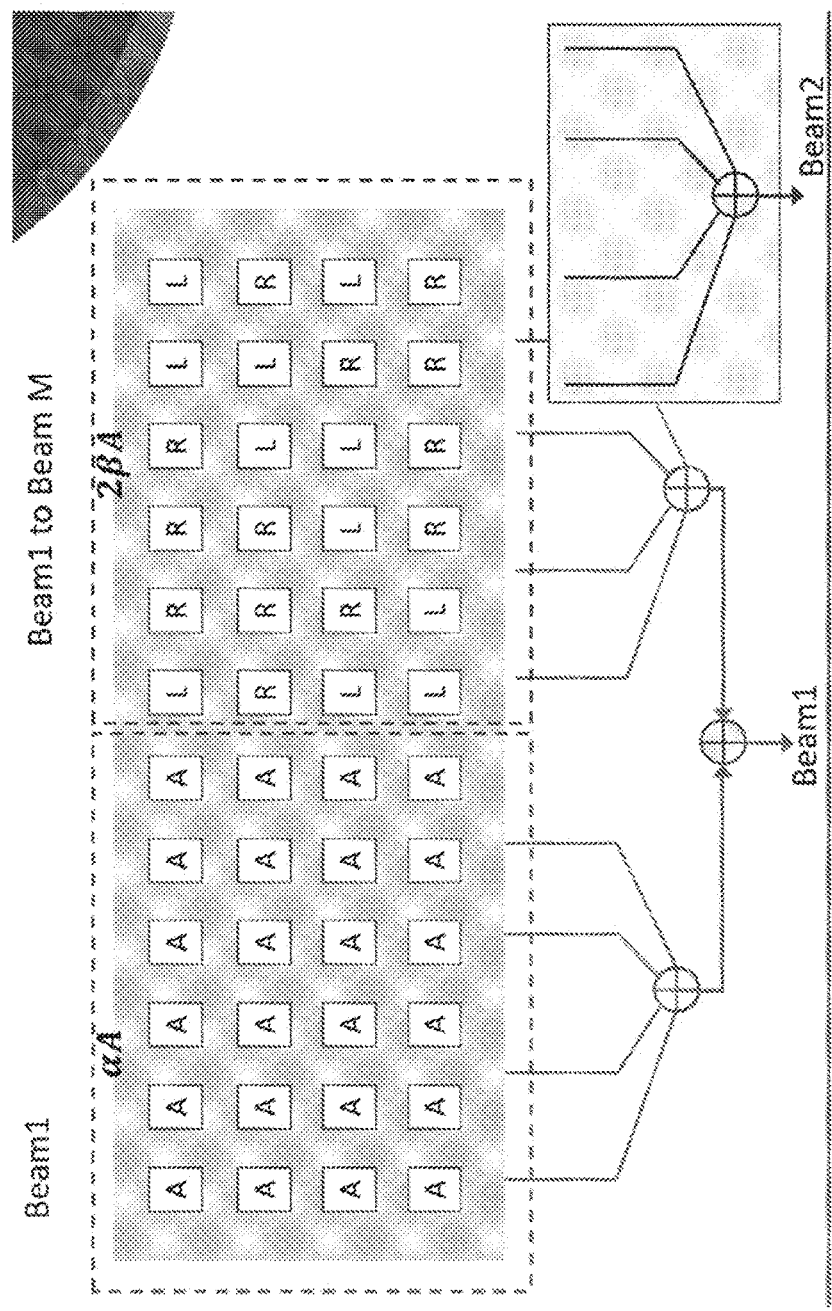

FIG. 6D illustrates a specific not limiting example of a composite antenna configuration with the mixture/combination of the analog polarization control and dual circular polarization digital control circuits. In to distribute the 3 dB loss in an asymmetric manner, a first plurality of antenna elements are operated to form Beam 1 antenna pattern, which is a single beam with partially analog polarization control ($\alpha$) and partially dual circular polarization digital control ($\beta$), and a second plurality of antenna elements are operated to form Beam 2 antenna pattern, which is a multi-beam (Beams M) pattern obtained with the dual circular polarization digital control ($\beta$). Such asymmetric distribution can be determined as follows: Let us consider the total area of the antenna as $\gamma A$, where $0<\gamma \leq 2$; part of the area with single bema (Beam 1) as $\alpha A$, where $0<\alpha \leq 2$; and part of the area with remaining multi-beams including the Beam 1 as $\beta A$, where $0<\beta \leq 2$. The total effective area of Beam 1 is determined as: $\alpha A+\beta A=\delta A$, $\alpha+\beta=\delta$, where $0<\delta \leq 2$ and $\delta \leq \gamma$. The total effective area of rest of beams is $\beta A$: $\alpha+2\beta=\gamma$.

FIGS. 7A-7D exemplify how the number of antenna elements, and accordingly the active area of the antenna can be controlled by controllably switching/shifting the antenna elements between the single-beam and multi-beam operations. Additional antenna area allows better heat dissipation for the same number of components. Also, such "mixed" configuration reduces the complexity since routing is simpler due to single port per element vs dual port per element for digital polarization control (V and H), while skew factors between the V and H pairs are preferably kept small for digital polarization control. Also, this configuration provides flexibility in the antenna operation. For example, the antenna can be turned off or on for optimized single beam and multi-beam operations to save average power; as well as the polarization control can be dynamically moved from analog to digital and vice versa. Turning back to FIGS. 1C and 1D, it should be noted that if multibeam antenna operation mode is a dominant scenario (i.e. two or more beams are being received for more than 70% of time), then instead of constructing the LHCP and RHCP signals within the RF circuit using a linear patch (FIG. 1C), the circular patch of FIG. 1D can be used which directly provides LHCP and RHCP signal (while saving power).

The invention claimed is:

1. A control system for controlling operation of a phased-array antenna comprising N antenna elements each comprising H and V polarization terminals, the control system comprising:

an analogue circular polarization system comprising an array of N analogue circular polarization circuits associated with said N antenna elements, respectively, such that each analogue circular polarization circuit is connectable to the V and H polarization terminals of the respective antenna element, and is configured and operable for carrying out the following: in the antenna element operation in a receiving configuration processing H and V linear polarization components of an operational signal being received by the respective antenna element as an analog circular polarization signal component, and in the antenna element operation in a transmission configuration processing an analog circular polarization signal component of an operation signal by the respective antenna element as the H and V linear polarization components being transmitted, wherein said analogue circular polarization system thereby operates with N analog circular polarization signal components each being either left or right circular polarization signal;

a digital polarization control system comprising:

an array of N convertors associated with said N analogue circular polarization circuits, respectively, for converting between the N analog circular polarization signals and N respective digital circular polarization signals, such that each antenna element is associated with a respective single one of said N convertors;

an array of N digital polarization controlled beamformers connectable, respectively, to said N convertors, each digital polarization controlled beamformer comprising at least two beam forming channels associated with at least two, first and second, respective beams of different beam directions and/or different polarizations being operated by the antenna element, each of said at least two beam forming channels being configured and operable to apply phase shifting to the respective digital circular polarization signal based on data indicative of a beaming direction ($\alpha$) of a respective beam to be operated and the left or right polarization of circular polarization signal, and a relative phase ($\phi$) associated with the beaming direction ($\alpha$) and a location of the respective antenna element in the array, to thereby form at least two phase shifted signals corresponding to said at least two, first and second, respective beams; and a plurality of digital signal splitters and/or combiners configured and operable for separately combining the phase shifted signals corresponding to respectively the at least first and second beams, wherein at least two convertors of said N convertors are connected to a respective one of the signal splitters and/or combiners, and wherein each of said digital splitters and/or combiners, connected to the at least two converters, is configured and operable for converting between the digital circular polarization signals of opposite left and right circular polarizations of the at least two convertors and V and H linear polarization components and splitting and/or combining the opposite left and right circular polarization signals of the at least two convertors.

2. The control system according to claim 1, wherein each digital polarization controlled beamformer is associated with memory storing said data indicative of the linear polarization of received signal ($\alpha$) and the relative phase ($\phi$) indicative of beaming direction for the respective antenna element in the array.

3. The control system according to claim 1, wherein the analogue circular polarization circuit is configured and operable to convert the H and V polarization components to the circular polarization signal component by combining the H and V polarization components with "+90°" or "−90°" phase shift.

4. The control system according to claim 1, wherein the analogue circular polarization circuit is configured and operable to utilize data indicative of a carrier frequency ($f_c$) of the beams being received to demodulate the circular polarization signal, said N convertors performing the conversion between the analog and digital signals with respect to a demodulated circular polarization signal.

5. The control system according to claim 1, wherein each of said at least two beam forming channels is configured and operable to apply the phase shifting to the respective digital circular polarization signal to thereby form a certain m-th direction beam with a first linear polarization by applying either a "positive" phase shift ($\phi_i+\alpha_m$) to the left circular polarization signal or "opposite" phase shift ($-(\phi_i+\alpha_m)$) to the right circular polarization signal, $\phi_i$ being the antenna element's position dependent phase required for the beam forming and $\alpha_m$ being the polarization dependent skew correction associated with the required linear polarization and the beam direction.

6. The control system according to claim 1, wherein said array of N antenna elements and the analogue circular polarization circuits are configured and operable to define the circular polarization signal components of the left and right circular polarizations.

7. The control system according to claim 6, wherein said array of N antenna elements with their respective N analogue circular polarization circuits are formed by first and second sub-arrays, each of the analogue circular polarization circuits of the first sub-array being configured and operable to perform said converting to produce the circular polarization signal component of the left circular polarization, and each of the analogue circular polarization circuits of the second sub-array being configured and operable to perform said converting to produce the circular polarization signal component of the right circular polarization.

8. The control system according to claim 7, wherein the first and second sub-arrays include identical or different numbers of the analogue circular polarization circuits.

9. The control system according to claim 8, wherein the analogue circular polarization circuits of the first and second sub-arrays are randomly arranged between them forming said array of the N analogue circular polarization circuits.

10. The control system according to claim 7, wherein the analogue circular polarization circuits of the first and second sub-arrays are alternatively arranged forming said array of N analogue circular polarization circuits.

11. The control system according to claim 6, comprising an orientation controller configured and operable for dynamically changing orientation of the H or V ports of the antenna elements by +90° or −90° polarization rotation to produce time series randomization of the circular polarization signal component of the left and right circular polarization.

12. The control system according to claim 6, wherein each of said plurality of the digital signal splitters and/or combiners is configured and operable for separately combining the phase shifted signals corresponding to the right circular polarization signal components and the phase shifted signals corresponding to the left circular polarization signal components, corresponding to the same beam.

13. The control system according to claim 1, further comprising analogue polarization control circuits associated with at least some of the N antenna elements, and a controller configured and operable for selectively coupling selective antenna elements to either one of the analogue polarization control circuits and the digital polarization control system.

14. A phased-array antenna operation system according to claim 1, wherein the control system further comprises analogue polarization control circuits associated with at least some of the N antenna elements, and a controller configured and operable for selectively coupling selective antenna elements to either one of the analogue polarization control circuits and the digital polarization control system.

15. A phase array antenna system comprising:
at least one array of N antenna elements each comprising H and V polarization terminals; and
the control system according to claim 1 for controlling operation of said at least one array of N antenna elements in either one or both of signal transmitting and signal receiving modes.

16. A control system for controlling operation of a phased-array antenna comprising N antenna elements each comprising H and V polarization terminals, the control system comprising:
an analogue circular polarization system comprising an array of N analogue circular polarization circuits associated with said N antenna elements, respectively, each analogue circular polarization circuit being connectable to the V and H polarization terminals of the respective antenna element, and being configured and operable for receiving H and V polarization components of the respective antenna element as a circular polarization signal being either left or right circular polarization signal, and
a digital polarization control system comprising:
an array of N A/D convertors associated with said N analogue circular polarization circuits, respectively, for converting, respectively, the N analog circular polarization signals into N respective digital circular polarization signals such that each antenna element is associated with a respective single one of said N A/D convertors;
an array of N digital polarization controlled beamformers connectable respectively to said N A/D convertors, each digital polarization controlled beamformer comprising at least two beam forming channels for receiving, by the antenna element, at least two, first and second, respective beams of different beam directions and/or different polarizations, each of said at least two beam forming channels being configured and operable to apply phase shifting to the respective digital circular polarization signal based on data indicative of a beaming direction (α) of a respective beam to be received thereby and the left or right polarization of circular polarization signal, and a relative phase (φ) associated with the beaming direction and a location of the respective antenna element in the array, to thereby form at least two phase shifted signals corresponding to said at least two, first and second, respective beams; and a plurality of digital signal combiners configured and operable for separately combining the phase shifted signals corresponding to respectively the at least first and second beams, wherein at least two convertors of said N A/D convertors are connected to a respective one of the digital signal combiners, and wherein each of said digital signal combiners is configured and operable for converting the digital circular polarization signals of opposite left and right circular polarizations of the at least two A/D convertors into V and H linear polarization components and combining the opposite left and right circular polarization signals of the at least two convertors.

17. A method for controlling operation of a phased-array antenna including an array of N antenna elements comprising H and V polarization terminals, the method comprising:

for each antenna element, applying analogue signal processing for carrying out the following: in the antenna element operation in a receiving configuration, processing H and V polarization components of an operational signal being received by the respective antenna element as an analog circular polarization signal component being either left or right circular polarization signal, and in the antenna element operation in a transmission configuration processing an analog circular polarization signal component of an operation signal of the respective antenna element as the H and V linear polarization components being transmitted, said analogue signal processing thereby operating with N analog circular polarization signal components each being either left or right circular polarization signal;

applying digital signal processing comprising:
converting between the N analog circular polarization signals and N respective digital circular polarization signals, such that the N antenna elements are associated with N respective convertors;

applying polarization controlled beamforming to each of the digital circular polarization signals by at least two beam forming channels corresponding to at least two, first and second, respective beams of different beam directions and/or different polarizations being received by the antenna element, each of said at least two beam forming channels being configured and operable to apply phase shifting to the respective digital circular polarization signal based on data indicative of a beaming direction (α) of a respective beam to be received thereby and the left or right polarization of circular polarization signal, and a relative phase (φ) associated with the beaming direction and a location of the respective antenna element in the array, to thereby form at least two phase shifted signals corresponding to said at least two, first and second, respective beams; and providing connection of at least two convertors of said N convertors to a respective one of a plurality of signal splitters and/or combiners for separately combining the phase shifted signals corresponding to respectively the at least first and second beams, wherein each of said digital splitters and/or combiners operates for converting between the digital circular polarization signals of opposite left and right circular polarizations of the at least two convertors and V and H linear polarization components and splitting and/or combining the opposite left and right circular polarization signals of the at least two convertors.

* * * * *